US005582319A

United States Patent [19]

Heyes et al.

[11] Patent Number: 5,582,319
[45] Date of Patent: Dec. 10, 1996

[54] CAN END FORMED FROM LAMINATED METAL SHEET

[75] Inventors: Peter J. Heyes; Alison M. Brown, both of Wantage, United Kingdom

[73] Assignee: CarnaudMetalbox plc, United Kingdom

[21] Appl. No.: 295,867

[22] PCT Filed: Mar. 4, 1993

[86] PCT No.: PCT/GB93/00446

§ 371 Date: Sep. 6, 1994

§ 102(e) Date: Sep. 6, 1994

[87] PCT Pub. No.: WO93/17864

PCT Pub. Date: Sep. 16, 1993

[30] Foreign Application Priority Data

Mar. 6, 1992 [GB] United Kingdom ................... 9204972

[51] Int. Cl.[6] .................. B32B 1/04; B32B 15/08; B32B 15/20; B32B 27/36
[52] U.S. Cl. .................. 220/454; 220/457; 220/623; 220/626; 428/35.8; 428/35.9; 428/458; 428/461; 428/910; 156/308.2; 156/390.9
[58] Field of Search ................ 428/34.1, 35.7, 428/35.8, 35.9, 457, 458, 461, 910; 156/69, 308.2, 309.6, 309.9, 244.11, 244.24, 322, 324.4; 264/145, 153, 163; 528/302, 305, 308, 308.6, 308.7; 220/265, 268, 269, 270, 600, 611, 623, 624, 626, 454, 456, 457

[56] References Cited

U.S. PATENT DOCUMENTS

| 4,143,790 | 3/1979 | Ueno et al. ................ 220/458 |
| 4,917,260 | 4/1990 | Heyes et al. ................ 220/270 |
| 4,945,008 | 7/1990 | Heyes et al. ................ 428/623 |
| 4,946,063 | 8/1990 | Heyes et al. ................ 220/270 |
| 4,957,820 | 9/1990 | Heyes et al. ................ 428/623 |
| 4,980,210 | 12/1990 | Heyes ....................... 428/35.9 |
| 5,059,460 | 10/1991 | Heyes et al. ................ 428/35.3 |
| 5,079,052 | 1/1992 | Heyes et al. ................ 428/35.3 |
| 5,093,208 | 3/1992 | Heyes et al. ................ 428/623 |
| 5,112,695 | 5/1992 | Watanabe et al. ............ 428/458 |
| 5,149,389 | 9/1992 | Heyes et al. ................ 156/272.4 |
| 5,238,517 | 8/1993 | Heyes ....................... 156/243 |
| 5,272,011 | 12/1993 | Tanaka et al. .............. 428/418 |
| 5,318,648 | 6/1994 | Heyes et al. ................ 156/244.24 |

FOREIGN PATENT DOCUMENTS

| 0153115 | 8/1985 | European Pat. Off. . |
| 0312304A1 | 4/1989 | European Pat. Off. . |
| 0312303A1 | 4/1989 | European Pat. Off. . |
| 0312302A1 | 4/1989 | European Pat. Off. . |
| 0384606A1 | 8/1990 | European Pat. Off. . |
| 0402004A1 | 12/1990 | European Pat. Off. . |
| 58-25591 | 5/1983 | Japan . |
| 1566422 | 4/1980 | United Kingdom . |
| 2123746 | 2/1984 | United Kingdom . |

*Primary Examiner*—Paul J. Thibodeau
*Assistant Examiner*—Vivian Chen
*Attorney, Agent, or Firm*—Burns, Doane, Swecker & Mathis, L.L.P.

[57] ABSTRACT

A can end is formed from a metal sheet having adhered thereto a coating of a semi-crystalline thermoplastic polyester film. The can end comprises a central panel, a panel wall dependent from the periphery of the centre panel, an annular countersink bead extending outwardly from the panel wall, a chuck wall extending upwardly from the periphery of the countersink bead and an annular seaming panel extending radially from the chuck wall. The metal sheet comprises an aluminum alloy having a magnesium content between 0.8% and 2.0% by weight and manganese content between 0.6% and 1.5% by weight; the polyester coating has a crystallinity factor in the range 0.05 to 0.5 measured by X-ray diffraction; and the distance between the chuck wall and panel wall is between 0.85 mm and 1.0 mm as measured at a height of 0.45 mm above the lowest part of the upper surface of the countersink bead.

36 Claims, 7 Drawing Sheets

CAN END FORMED FROM LAMINATED METAL SHEET

FIELD OF THE INVENTION

The present invention relates to a process for producing polymer film coated metal sheet and to can ends of polymer film coated metal sheet.

BACKGROUND TO THE INVENTION

Metal materials coated with thermoplastic polymer film are well known. The use of such materials for rigid metal packaging has been widely described.

Simultaneous lamination of polyester and polyolefin films to metal sheet is disclosed in EP-A-0312302. This specification is primarily concerned with lamination to steel sheet of a composite polyester film on one major surface and a polyolefin containing film on the other major surface. The polymer film coated steel sheet was found to be useful in the production of can ends.

Simultaneous lamination of a polyester/metal/polyester laminate is also disclosed in EP-A-0312303 in which a composite coextruded polyester film is adhered to steel sheet. Good corrosion resistance was imparted by the use of an outer polyester layer having a crystallinity greater than 30% as measured by density.

EP-A-0312304 describes a polymer film coated metal sheet to which is adhered an amorphous polyester. The polymer film coated metal sheet was found to be particularly useful in the formation of drawn and wall ironed cans made from aluminium 3004 alloy.

JP 58-25591 describes a process for the production of a metal substrate coated with a thermoplastic polyester resin using low crystallinity starting film material. It was found that a crystallinity range of 5 to 50% for the polyester in the laminate was useful because the forming and processing properties of coated metals and the corrosion resistance of the formed, processed products were dramatically increased by maintaining the degree of crystallisation of the resin layer to within the specified limits.

GB-A-2123746 discloses a method of producing a metal sheet laminated with a polyester resin film by coating the metal with a crystalline and oriented polyester resin film. Laminates of steel or aluminium were produced by a controlled single step, metal heating process, film application and then without reheating, quenching.

Techniques for the manufacture of beverage can ends are well established.

EP-A-0153115 discloses a method of making a can end. According to this method, a disc is blanked and a shallow drawn cup is formed from the disc. The shallow drawn cup is reformed into a shell by forming a centre panel, allowing the wall of the cup to fold and producing a countersink or reinforcing channel. The presence of the countersink is acknowledged to be important in rendering the can end resistant to internal carbonation pressure. In a typical can end, the profile of the countersink and the size of the countersink radius limit the geometric strength. In general, the smaller the countersink radius, the stronger the can end in resistance to outward movement when pressurised as part of a filled can.

Conventionally, a material which has hitherto been extensively used commercially for easy open beverage can ends is lacquer coated aluminium alloy AA5182. This alloy has a high magnesium content of around 4 to 5% and the high magnesium content of the 5182 alloy gives it high strength. Because of its strength and good formability, this alloy confers excellent pressure resistance, typically 100 psi to can ends for a 5182 gauge of 0.28 mm. A problem with the 5182 alloy is that, because of its high strength, the cost to produce material for can ends is relatively large. In particular, the high magnesium content adds to the material cost and increases the mill power, mill energy consumption and time required to roll 5182 to can endstock gauges compared to a lower magnesium content alloy such as AA3004. Both factors, combined with a poorer metal yield for 5182, result in a higher manufacturing cost for 5182 than 3004.

In order to reduce the cost of producing the can ends, lacquered 5182 alloy can be made to thinner gauge. However, thinner gauge 5182 alloy is less resistant to pressure. The pressure resistance of can end shells produced from thinner gauge 5182 can be increased to acceptable values (90 psi) by deepening the countersink depth. For 0.245 mm 5182 the countersink depth must be increased from the standard 0.250 inches to 0.270 inches, however the end is no longer seamable to cans without a change in the seamer operation. Ends not interchangeable on seaming with standard ends used in the beverage industry are not desirable.

Attempts to increase the pressure resistance of thinner gauge 5182 by tightening the countersink radius of the can ends are comparatively ineffective (see FIG. 8) and may result in a new problem. Cracks appear in the reformed lacquered 5182 material which in production could result in an unacceptable level of end metal failures and, if used commercially, would result in corrosion of the can end with consequential damage to the contents of the can.

In order to overcome the problems of cost and interchangeability, it has been surprisingly found that thermoplastic polymer film coated aluminium alloys of lower magnesium content than 5182 and lower strength than 5182 can be used to form can ends having a countersink radius of sufficient tightness to confer upon the can ends commercially useful pressure resistances.

SUMMARY OF THE INVENTION

The present invention provides a can end formed from a metal sheet having adhered thereto a coating of a semi-crystalline thermoplastic polyester film comprising a central panel, a panel wall dependent from the periphery of the centre panel, an annular countersink bead extending outwardly from the panel wall, a chuck wall extending upwardly from the periphery of the countersink bead and an annular seaming panel extending radially from the chuck wall, characterised in that the metal sheet comprises an aluminium alloy having a magnesium content between 0.8% and 2.0% by weight and a manganese content between 0.6% and 1.5% by weight; the polyester coating has a crystallinity factor in the range 0.05 to 0.5 measured by X-ray diffraction; and the distance between the chuck wall and panel wall is between 0.85 mm and 1.0 mm as measured at a height of 0.45 mm above the lowest part of the upper surface of the countersink bead. The polyester coating has no substantial regions of oriented crystalline material having a crystallinity factor above 0.5.

That distance is hereinafter defined as the "countersink parameter". Preferably the countersink parameter is in the range 0.87 to 0.95 mm.

The crystallinity factor is determined by the method as defined herein. Preferably the crystallinity factor is in the range 0.08 to 0.45.

The aluminium alloy optionally includes: up to 0.4% silicon; up to 0.35% copper, typically 0.2 to 0.35% such as up to 0.25% to 0.3%; up to 0.8% iron, typically to 0.7%; and up to 0.25% zinc. Aluminium alloys falling within this composition range are hereinafter referred to as 3XXX. Thus, 3XXX includes aluminium 3004 but not the entire range of 5017 (an alloy produced from recycled beverage cans).

Preferably the magnesium is present in the alloy up to 1.8%, more preferably above 1%. Preferably the manganese is present in the alloy up to 1.2%, more preferably above 0.7%.

Preferably the entire polyester film reaches during coating to the metal sheet a temperature equivalent to at least the onset melting temperature of the polyester less 16° C.

The present invention also provides a process for producing a coated metal sheet in which at least one surface coated with a semi-crystalline thermoplastic polyester.

The metal sheet comprises an aluminium alloy of the 3XXX type. The polyester may be laminated as a monolayer film, a coextruded film or a composite film.

The thickness of the metal will be in a range compatible with the double seaming operation for sealing the can end to a can, typically 0.26 mm to 0.30 mm for 206 diameter ends with a 6.35 mm (0.250 inch) countersink depth.

Aluminium alloys useful as the metal sheet of the present invention typically have, after coating, a proof stress at 0.2% elongation in the range 265 to 300 MPa.

Among preferred aluminium alloys containing manganese and magnesium are those from the aluminium AA3000 series of alloys and new alloys produced from recycled used beverage cans such as 5017. A particularly preferred aluminium alloy is aluminium AA3004. This alloy has relatively low manufacturing costs, is widely commercially available and can be readily laminated with polyester films in such processes as described in EP-A-312303 or EP-A-312304. The laminates produced may have a proof stress in the range 265 –300 MPa depending on the in-going 3004 strength and lamination temperature.

Such polymer coatings can provide deep formability and excellent corrosion protection even after very severe forming, such as in DWI can forming. However, the formability is reduced if the polyester coating is not amorphous and typically a semi-crystalline coated 3004 can be wall ironed by only about 20% compared to about 70% for amorphous coatings. The thermoplastic plastic polymer in the laminate must be a semi-crystalline thermoplastic polymer. If an amorphous polyester is used, recrystallisation occurs during pasteurisation of the filled can. The result of the recrystallisation is that the polyester coating has a cloudy or blushed appearance. The degree of blushing may be variable depending on the contact area with the water used in the pasteurisation process. This is undesirable because poor end appearance of the cans is commercially unacceptable.

Use of amorphous polyester is also undesirable because easy open ends must open without excess feathering of the internal coating around the opened scored region. Amorphous polyester coatings are too elastic and do not break cleanly but instead stretch to give a ragged edge upon opening. Polyesters in a semi-crystalline form are less elastic and break cleanly at the score.

Semi-crystalline thermoplastic polyesters usable in the invention include polyethylene terephthalate and closely related copolyesters. Typically such copolyesters will be derived from at least 60 mole % terephthalic acid, 60 mole % ethylene glycol and up to 40 mole % of a second dicarboxylic acid and 40 mole % of a second dihydric alcohol. Typical acids include: isophthalic acid, azeleic acid, sebacic acid, adipic acid. Typical alcohols include: diethylene glycol, triethylene glycol, and cyclohexane dimethanol (CHDM). The polymer may be adhered to the metal sheet as a monolayer film, or as a coextruded film or as a composite film. Where a monolayer polyester film is used, copolyesters are preferred such as copolyesters of terephthalic acid, ethylene glycol and diethylene glycol or copolyesters of terephthalic acid, azelaic acid, ethylene glycol and diethylene glycol or copolyesters of terephthalic acid, isophthalic acid and ethylene glycol. Advantageously, the proportions of the components of the copolyester are such that the resin onset melting point lies in the range 195° C. to 230° C. Onset melting points above 230° C. demand excessively high metal temperatures in lamination and those below 195° C. have the disadvantage of being difficult to control in the process of biaxial orientation. Film onset melting temperatures are measured by differential scanning calorimetry (DSC).

Where the semi-crystalline thermoplastic polymer comprises a coextruded film, the coextruded film comprises an inner layer and an outer layer. Typically, the inner layer has a lower melting temperature than the outer layer so that the coextruded film may be adhered to the metal sheet without melting the outer layer.

The inner layer of the coextruded film typically comprises a copolyester. The copolyester may be formed from two dicarboxylic acids and one or more dihydric alcohols, such as from isophthalic acid, terephthalic acid, and a dihydric alcohol such as ethylene glycol; or from ethylene glycol, diethylene glycol and terephthalic acid. Advantageously, the proportions of the components of the copolyester are such that the onset melting point lies in the range 160° C. to 220° C. Melting points below 160° C. lead to difficulties in film processing particularly in the coextrusion process owing to problems of mis-matching of the temperature-viscosity characteristics of the polymer layers in the coextrudate. Melting points above about 220° C. lead to reduced adhesion to the metal. The outer layer of the coextruded film is typically a polyester such as polyethylene terephthalate or a copolyester with an onset melting point typically in the range 230° C. to 250° C.

Where the semi-crystalline thermoplastic polyester comprises a composite film, the composite film comprises an inner layer and an outer layer. Typically the outer layer is a biaxially oriented polyethylene terephthalate (PET) film with an onset melting point in the range 230° C. to 260° C. and a crystallinity factor in the range 0.05 to 0.5. Typically the inner layer contacting the metal comprises an amorphous polyester.

The inner layer of the composite film is applied as a coating to the PET film either during or after the PET film manufacturing process. The inner layer thickness is typically 0.5 microns to 5 microns, preferably 1 microns to 2 microns, typically applied by extrusion coating or roller coating techniques.

The other major surface of the metal sheet may be coated with a coating which typically comprises a copolyester or a maleic anhydride graft modified polyolefin such as polypropylene. Such materials may be applied from solution or dispersion in solvents by roller coating or by extrusion coating.

Copolyesters may be formed from two dihydric alcohols and two dicarboxylic acids as described above and should melt in the range 150° C. to 210° C. giving the laminate stability if ends are printed and adhesion performed at low T1 values.

Preferably the other major surface of the metal sheet is coated with a coextruded polyolefin film comprising an inner layer of maleic anhydride graft modified polyolefin and an outer layer of polyolefin such as polypropylene or an ethylene-propylene copolymer. The coextruded polyolefin film may be biaxially oriented.

The extent of maleic anhydride graft modification of the polyolefin should be sufficient to give adhesion to both PET and aluminium and will typically be 0.2 to 0.5%.

The polyester film may be pigmented with titanium dioxide or may be coloured with a coloured dyestuff.

In another aspect of the invention, there is provided a process which comprises thermally laminating a monolayer polyester film to the metal sheet by heating the metal sheet to a temperature T1, applying the film to a major surface of the metal sheet to form an initial laminate and reheating the initial laminate to a temperature T2, wherein, for a melting temperature Tm of the monolayer polyester film $Tm-5°C.<=T1<=Tm+40°C.$ and $Tm-5°C.>=T2>=Tm-20°C.$, so that the crystallinity factor of the polyester in the laminate is in the range 0.05 to 0.5. For the avoidance of any doubt, expressions of the form $Tm-5°C.<=T1<=Tm+40°C.$ (and $Tm-5°C.>=T2>=Tm-20°C.$, etc) appearing in this specification mean that T1 is in the range Tm-5° C. to Tm+40° C. (and T2 is in the range Tm-20° C. to Tm-5° C., etc). Preferably, $T1>=Tm$.

In a further aspect the process comprises thermally laminating a two layer polyester film to the metal sheet by heating the metal sheet to a temperature T1, applying the film to a major surface of of the metal sheet to form an initial laminate and reheating the initial laminate to a temperature T2, the polyester film comprising an inner layer and an outer layer, wherein, for melting temperatures Tm(i) and Tm(o) of the inner and outer layers respectively, $Tm(i)<=T1<=Tm(o)+15°C.$ and $Tm(o)-3°C.>=T2>=Tm(o)-16°C.$, so that the crystallinity factor of the polyester in the laminate is in the range 0.05 to 0.5.

Where the two layer polyester film is a composite polyester film in which the inner layer is a non-crystallisable polyester, T1 needs only to be high enough to ensure the formation of an intimate and complete contact between film and metal surfaces so that bonding takes place.

In the process of the present invention where a monolayer film is used, this may be a polyester or copolyester single layer film with a gauge in the range 6 to 35 microns, typically 12 microns. Preferably, a biaxially oriented film is used. The onset melting point of the polymer in the film is advantageously in the range 195° to 230° C., preferably about 200°–220° C.

Monolayer films of various crystallinities can be used. The film crystallinity is controlled largely by the heat setting temperature following orientation. The starting crystallinity of the film can affect the lamination conditions and hence the crystallinity of the polyester in the final product. Advantageously, the crystallinity factor of the monolayer film applied to the metal sheet exceeds 0.05. Films with starting crystallinities in the range 10% to 45% as measured by density may be used.

A film of a starting crystallinity greater than around 10% as measured by density is desirable. In the production of biaxially oriented polyester film, the temperature to which the film is heated after stretching dictates the heat stability or shrinkage properties. If the crystallinity of the film is too low, excessive shrinkage occurs during lamination which is undesirable. The practical lower limit for the heat set temperature is the temperature necessary to stretch the film. The film must be stretched above the glass transition temperature. (Stretching the film alone can introduce around 8% crystallinity as measured by density).

In the process of the present invention a coextruded film, may be used, for example, a 12 micron polyester film comprising a 10 micron outer layer and a 2 micron inner layer. Preferably the polyester film is biaxially oriented. The outer layer may comprise polyethylene terephthalate with an onset melting point in the range 230° C. to 250° C., preferably about 240° C. The inner layer may comprise a copolyester of onset melting point in the range 160° C. to 220° C., preferably 180° C. to 190° C. The film heat setting temperature will be chosen to control film crystallinity and ensure that the inner layer is amorphous.

Following the heating of the metal sheet to temperature T1, the film to be laminated is typically applied to the metal sheet under pressure. This step is conveniently performed with the use of pinch rolls to achieve intimate and complete contact of the polyester with the hot metal surface. Reheating the laminate to temperature T2 is preferably achieved by indirect means such as induction heating. Advantageously, the laminate is held at temperature T2 for a period (typically two seconds) preferably followed by a rapid quenching. A rapid quenching step is conveniently performed in water, for example through a curtain of water.

Typical apparatus and conditions for these process steps are to be found in EP-A-0312302 and EP-A-0312303, both of the present applicant.

DESCRIPTION OF THE PREFERRED EMBODIMENTS

Lamination of Monolayer Film

Where Tm is the onset melting temperature of the monolayer film, $T1 >= Tm-5°$ C. If T1 reduces below $Tm-5°$ C., when the film contacts the metal, appropriate softening of the layer in contact with the metal does not occur. In such circumstances there is poor intimacy of film and metal and a sufficiently good even bond is not achieved. Scanning electron microscopy examination of a coated metal surface following lamination with a T1 below Tm shows blisters in the coating. Such blisters can result in pack test failure with beverage products.

The condition $T1 <= Tm+40°$ C., must be met. As T1 increases, so does the depth of film that melts on contact with the hot metal. If T1 is too high, the film becomes difficult to laminate because it creases and sticks to the lamination rolls. The crystallinity of the polymer in the laminated product is not sufficient to prevent blushing. The limit for T1 is lower for lower crystallinity films. Typically a monolayer film having an onset melting point of about 215° C. with crystallinity as measured by density of

| |
|---|
| 10% requires a T1 of >= 210° C. |
| 21% requires a T1 of >= 230° C. |
| 28% requires a T1 of >= 240° C. |
| 36% requires a T1 of >= 250° C. |

Additionally, if T1 exceeds Tm+50° C., the metal strength is reduced, thicker metal gauges are needed for adequate end performance and can end costs are increased.

Figure 7:
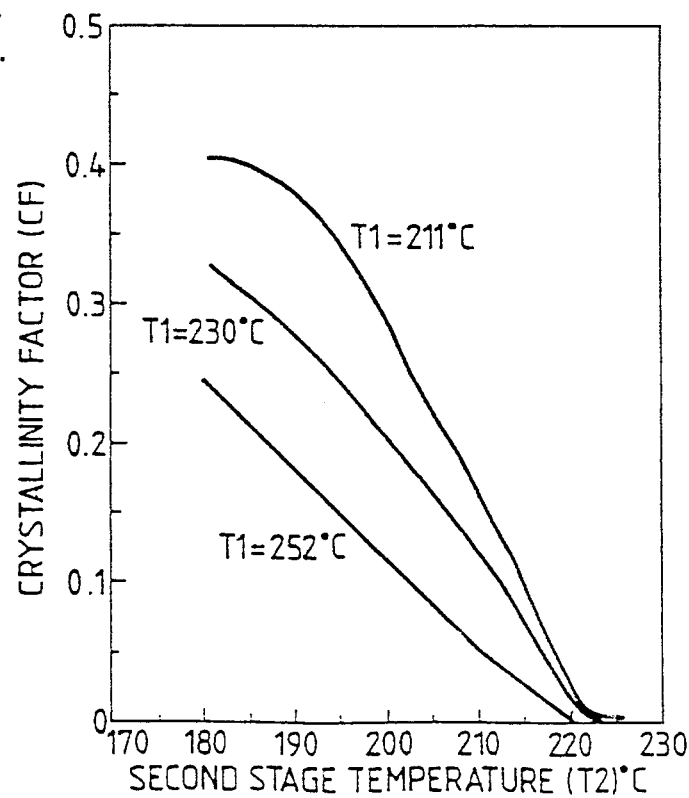
FIG. 7 shows a graph of crystallinity dependence of monolayer film on lamination temperature T2.

The relationships of crystallinity and T2 for different T1 temperatures for a monolayer biaxially oriented polyester film are shown in FIG. 7. The resin onset melting point is about 215° C. as measured by differential scanning calorimetry (DSC).

A further condition to be fulfilled is that the reheating temperature $T2 <= Tm-5°$ C., but $T2 >= Tm-20°$ C. As T2 increases so does the amorphous fraction of the polymer. For the reasons discussed, high amorphous content is undesirable.

The lower limit to the reheating temperature is $T2=Tm-20°$ C. There is no practical advantage in reducing T2 too greatly. No further significant gains can be made on selecting T2 values below Tm-20° C. because T1 then predominantly affects the crystallinity of the polymer and so T2 would no longer influence the crystallinity. No significant adhesion improvements occur below Tm-20° C.

Lamination of Coextruded Film

In this embodiment, the melting temperature of the inner layer polymer is designated Tm(i) and the onset melting point of the outer layer polymer is designated Tm(o). In this process $T1 >= Tm(i)$. If T1 is below Tm(i) the inner layer polyester does not flow into the metal surface and a continuous bond is not achieved. The temperature of the first heating step, $T1 <= Tm(o)+15°$ C. If T1 is above Tm(o)+15° C., the polymer film becomes difficult to laminate. The film creases badly and sticks to lamination rolls. Additionally, the metal strength is significantly reduced and the outer layer starts to melt in the first stage heating by contact with the metal. The result is that crystallinity of the polymer is undesirably reduced.

Figure 6:
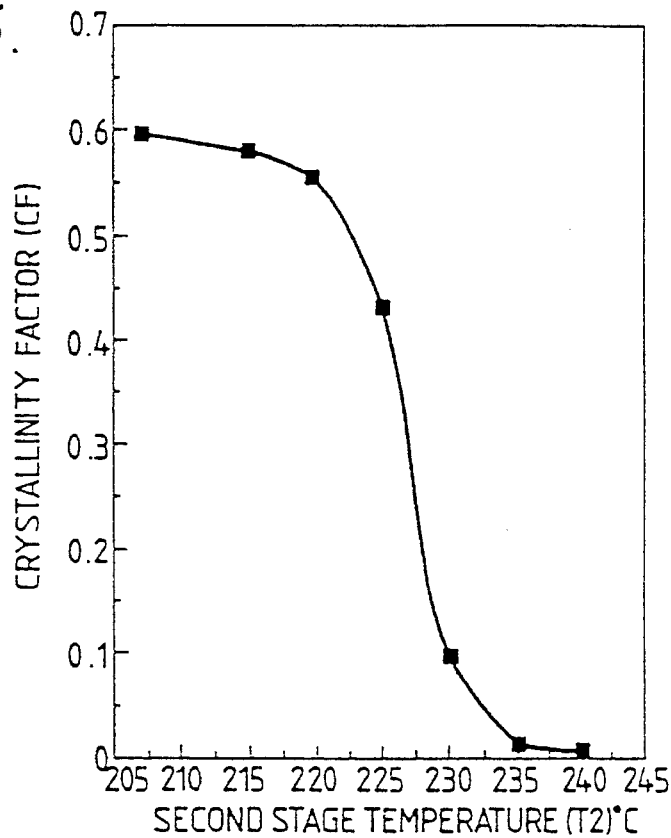
FIG. 6 shows a graph of crystallinity dependence of coextruded film on lamination temperature T2.

Reheating temperature is defined to be $T2 <= Tm(o)-3°$ C. As T2 increases above Tm(o), the film becomes amorphous. At Tm(o)-3° C. the crystallinity of the polymer is very sensitive to even small temperature changes and so $T2 <= Tm(o)-3°$ C. but it is preferred that T2 Tm(o)-16° C. This is illustrated in FIG. 6 for a polyethylene terephthalate outer layer film in which the resin (PET) onset melting point is about 240° C. and the film a biaxially oriented 12 micron coextruded film.

If T2 is maintained too low, the crystallinity of the film outer layer may not be significantly reduced, which can lead to cracking of the film when the score is produced. Additionally, preferably $T2 >= Tm(i)$. There is also no practical advantage in using T2 below the melting point of the inner layer because little improvement in adhesion is achieved.

Coated Metal Configurations

Figure 1:
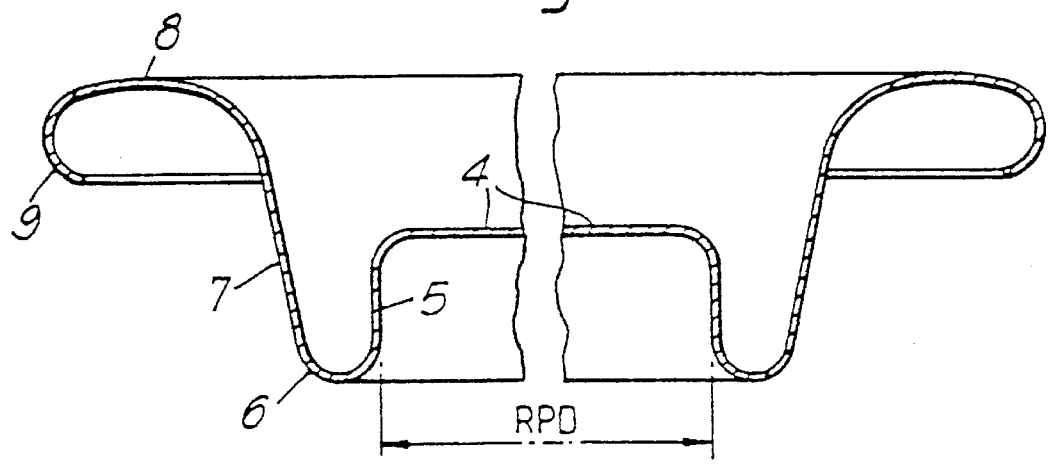
FIG. 1 shows a schematic representation of a cross section through a can end.
Figure 2:
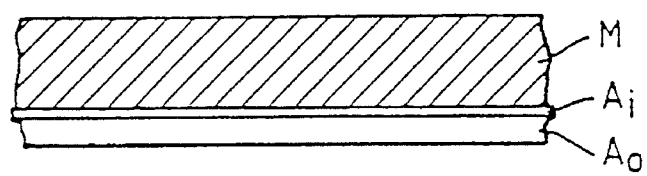
FIGS. 2 and 2A show schematic representations of composite or coextruded film laminated to one or both sides of a metal sheet with the same (2) or different (2A) films.
Figure 2A:
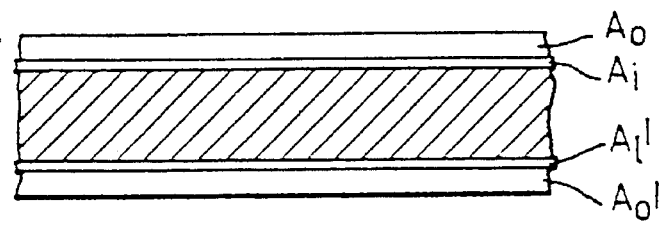

Referring to FIG. 2 and 2A, a laminate of metal sheet and coextruded film is shown in one of two embodiments. A coextruded film comprising inner layer Ai and outer layer Ao is either adhered directly to one major surface of the metal only or a first coextruded film is adhered to one major surface of the metal sheet and a further coextruded film comprising inner layer Ai' and outer layer Ao' (which may be the same or different from the first coextruded film) is applied to the other major surface of the metal sheet.

FIG. 2 also describes a laminate of metal sheet and a composite film in which Ao is PET and Ai is the inner layer of coating material.

Figure 3:
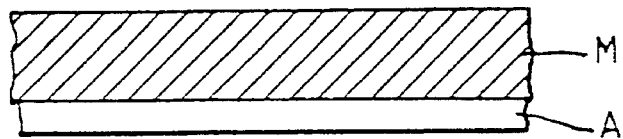
FIGS. 3 and 3A show schematic respresentations of a laminate of monolayer film laminated to one or both sides of a metal sheet with the same (3) or different (3A) polyester films.
Figure 3A:
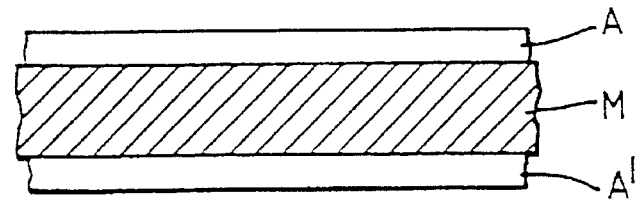
Figure 3B:
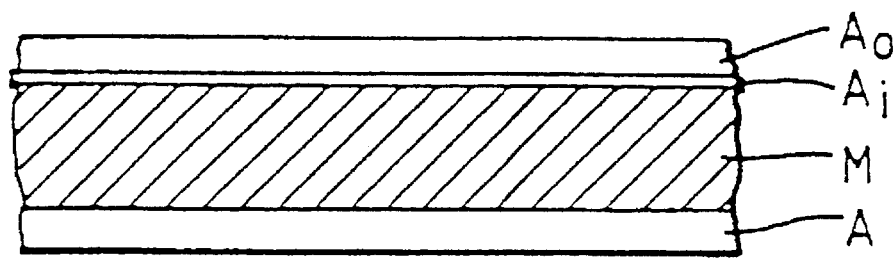
FIG. 3B shows a combination of coextruded and monolayer films on a metal sheet.

Referring to FIG. 3, 3A and 3B a monolayer film A is applied to one major surface of the metal sheet. Alternatively, the monolayer film A is applied to one major surface of the metal sheet and a further monolayer film A' (which may be the same or different from monolayer film A) or a coextruded film is applied to the other major surface of the metal sheet.

Figure 9:
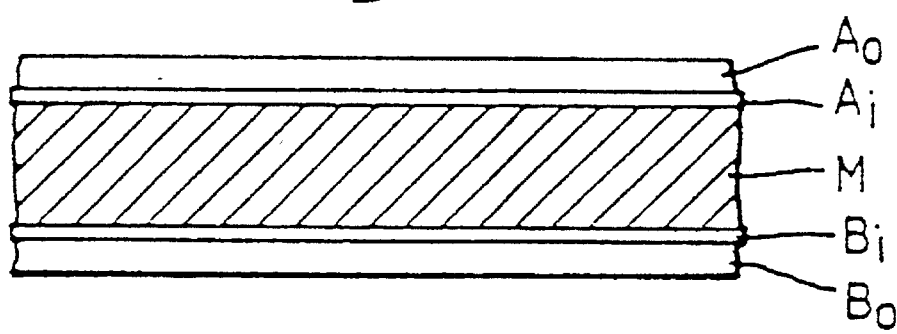
FIGS. 9 and 9A show schematic representations of a metal sheet coated with a composite or coextruded polyester film (9) or a monolayer film (9A) on one side and a coextruded polypropylene film on the other.
Figure 9A:
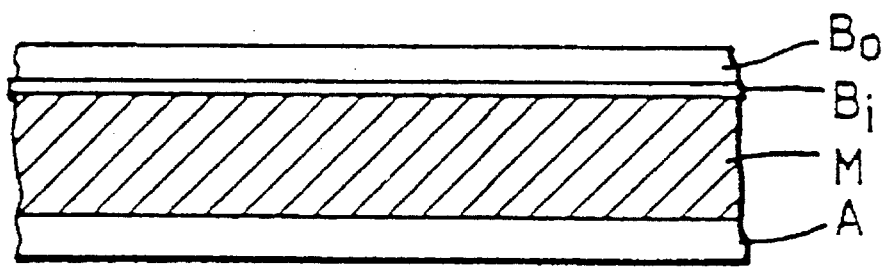

FIGS. 9 and 9A show schematic representations of a metal sheet coated with a polyester film Ao/Ai (9) or A (9A) on one side and a coextruded polypropylene film Bo/Si on the other side, in which B1 is a poly(propylene-ethylene) copolymer containing a maleic anhydride graft modified polypropylene.

Can End Dimensions

Figure 4:
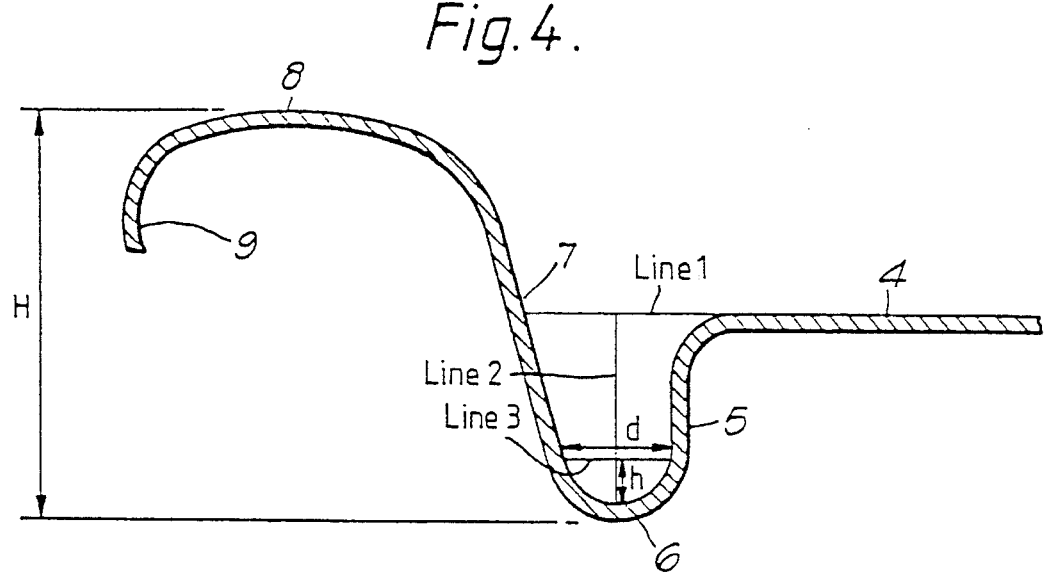
FIG. 4 shows in greater detail a cross section of the countersink portion of a can end.

The countersink parameter may be measured by the following method. Referring to FIG. 4, a countersink is shown formed by a panel wall 5 extending from panel 4 to chuck wall 7. Panel wall 5 and chuck wall 7 are joined by countersink bead 6 defining the lowest point of the countersink. Seaming panel 8 runs from chuck wall 7 to curl 9. Countersink depth H runs from the highest point of the seaming panel 8 to the lowest point of the countersink bead 6.

The end or shell to be measured is embedded in a cold curing transparent epoxy resin, such as Epofix, and allowed to cure. A line is marked at 90° to the rolling direction of the metal diametrically across the end and the end is cut in half along this line. The exposed surface is ground and polished to a 6 microns finish.

The countersink area is then examined using a microscope and the following measurements are made.

Distance d is the countersink parameter and is measured between chuck wall 7 and panel wall 5. Line 1 is drawn parallel to and in continuation of panel 4 to meet the chuck wall 7. Line 2 is drawn perpendicular to line 1 to pass through the maximum depth of the countersink bead A distance of 450±10 microns is measured from the countersink bead 6 along line 2 towards line 1 and a point at this distance is defined (distance denoted "h" on FIG. 4). Line 3 is drawn perpendicular to line 2 to intersect line 2 at the point defined and to meet the chuck wall 7 and panel wall 5. The length of line 3 is denoted the countersink parameter "d".

Figure 5:
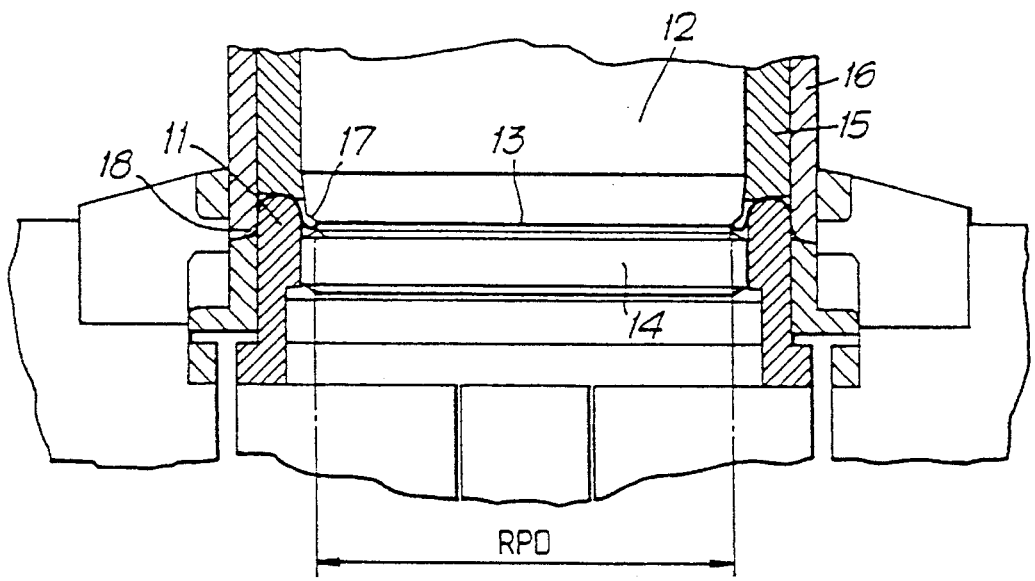
FIG. 5 shows in partial section a tooling for can end manufacture.

Referring to FIG. 5, tooling for can end manufacturing is shown. Shell 13 is punched by punch centre 12 onto reform pad 14. Knockout ring 15 is provided above die centre ring 11 and contained within punch 16. The operation gives punch centre radius 17 and draw radius 18.

EXAMPLES

Coils of AA3004, 3XXX, 5017 and AA5182 aluminium were converted into thermoplastic polyester coated material by the following process.

1. Cleaning and Pretreatment

The Surface of coils of aluminium from the rolling mill (as rolled) are covered in rolling lubricant and aluminium fines. This does not produce an effective surface for bonding to polymer.

Suitable pretreatments used to remove rolling oil and aluminium fines and to create a uniform surface layer with good adhesion to coatings include sulphuric acid anodising (SAA) phosphoric acid anodising (PAA), chromium phosphate pretreatment and zirconium phosphate pretreatment. These treatments incorporate three stages. Firstly the strip is cleaned. In the case of anodising, the anodising acid is used; in the case of chromium or zirconium phosphate treatments an alkaline preclean may be used. The cleaned strip is treated by hot immersion anodising (SAA or PAA) or by a spray or roller applied treatment for chromium or zirconium phosphates. The strip is either rinsed to remove any residual acid and dried or the roller applied treatments dried in-place.

2. Lamination

The cleaned and treated coil was laminated by the following process.

The metal was heated to a temperature T1, the two polymer films were each brought in contact with one of the major surfaces of the metal using pressurised nip rolls. The three layer laminate was heated to a temperature T2 and the laminate retained at an elevated temperature for around two seconds before being rapidly quenched by uniform weirs of water. The temperature ranges for both T1 and T2 are described in detail in the text.

3. Waxing

The surface of the polymer coated aluminium was lubricated with a thin layer of a paraffin wax typically 200±100 mg per m².

Using apparatus of type described briefly with reference to FIG. 5, it is possible to vary the profile of the countersink and the size of the countersink parameter. Further details of such apparatus may be found in EP-A-0153115 of the present applicant.

The dimensions of the countersink parameter are determined by the die centre ring-reform pad gap or, for a fixed die centre ring (DCR), the reform pad diameter. When the reform pad diameter (RPD) is varied and the cross section of lacquered aluminium 5182 end shells examined, it is observed that, as the countersink parameter is reduced by increasing RPD, there is a critical value at which the end is no longer interchangeable in double seaming or disruption appears in the 5182 material caused by forming/folding operations.

Interchangeability

Can ends are described as interchangeable when the double seam specifications are achieved without altering the operational settings of the double seaming machine from those appropriate to standard commercial can ends.

Certain critical dimensions are defined in Industry Specifications such as the Metal Packaging Manufacturer's Association Recommended Industry Specifications for Beer and Carbonated Soft Drink Cans. Section 6 of this document deals with Double Seam Standards. Provided the specified parameters are met, the double seam integrity is assured and seams will not leak. For 206 diameter beverage can ends, the critical dimensions are as follows:

| Bodyhook butting | 70% minimum |
| Actual overlap of Bodyhook and Endhook | 0.76 mm minimum |
| Tightness Rating for Endhook | 90% minimum |

The following end seam dimensions are used to achieve acceptable seams:

| Bodyhook Length | 1.65 ± 0.13 mm |
| Countersink Depth | 6.35 ± 0.13 mm |
| Seam Length | 2.80 mm maximum |
| Endhook Length | 1.5 ± 0.13 mm |
| Seam Gap | 0.13 mm maximum |
| Seam Thickness | (3 × End Thickness + 2 × Body Thickness + 0.15 mm) |

The geometry, gauge and dimensions of a can end all influence the double seaming process and ability to achieve the required seam dimensions.

In particular:

(1) The countersink parameter will influence the fit of the end to the seaming chuck and hence the bodyhook formation. If the countersink parameter is too small, the bodyhook length is inadequate.

Seam dimensions effectively limit the extent to which the countersink may be tightened.

(2) The endstock gauge cannot vary from the industry average by more than ±0.02 mm.

In the following Examples an X-ray diffraction method is used for calculating a measure of the crystallinity and orientation of the polymer coatings, which is called the "Crystallinity Factor", the measurement of which is defined below.

Crystallinity Factor Measurement

This X-ray diffraction (XRD) method may be summarised as follows.

Test Sample

A sample of laminate is cut from the strip and mounted on a flat aluminium plate (44×44 mm) using double sided adhesive tape so that the sample overlaps the plate by between 3 and 7 mm. The final trim of the sample is from the front to avoid raised edges. The sample is inserted with the bottom resting on the sample holder support and fixed in a central position with a backing screw. An X-ray tube is fitted with a copper target and is set at 40 KV and 25 mA. The XRD pattern is recorded from 4 to 20 degrees theta in steps of 0.02 degrees theta and with a count time of 1 second per point.

Control Sample

A control sample of ICI Melinex 800 polyester film of 12um thickness is mounted on a similar backing plate using double sided adhesive tape and its diffraction pattern is recorded under identical conditions as the test materials. The specification of this grade of film is described in ICI technical data sheet MX TD312 fourth edition 1985.

The scattering pattern from the control sample is recorded during the same working day as the test samples are measured.

Analysis

Figure 10:
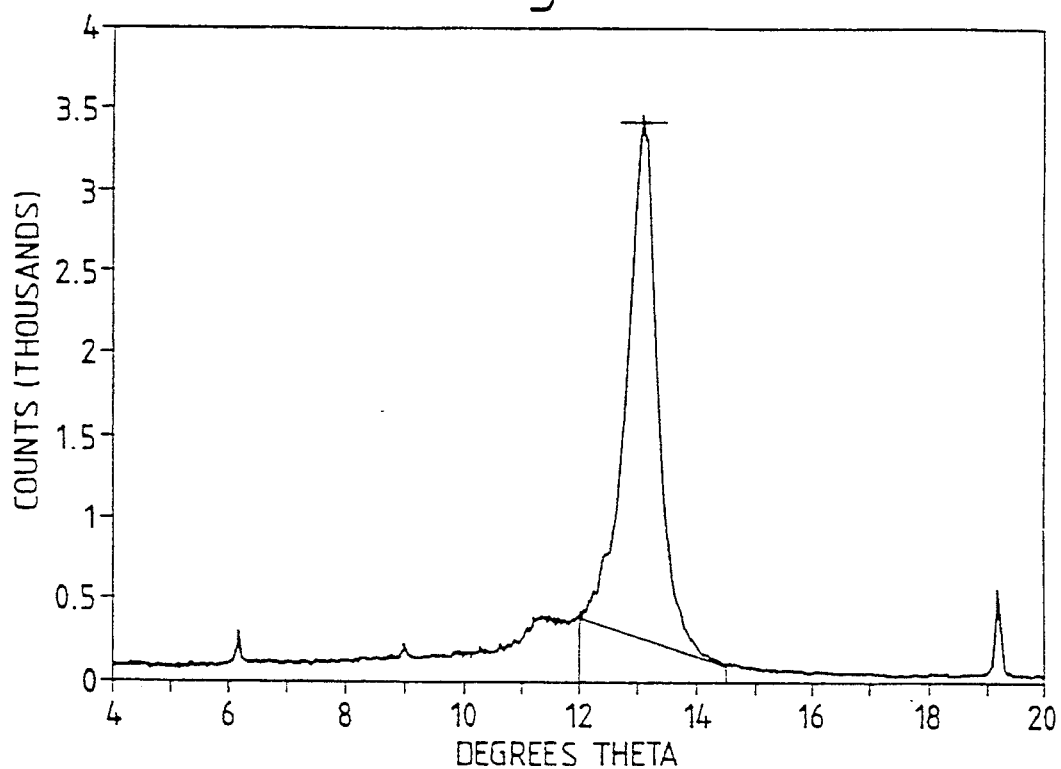
FIGS. 10 and 10A show a diffraction pattern as measured by XRD between 4 and 20 degrees theta showing the peak resulting from the 100 diffraction planes of Example 35(iii) and a control Example respectively.

The diffraction patterns of the test samples are analysed by measuring the height of the (100) peak at approximately 13 degrees theta. The peak and its surrounding area are smoothed visually to remove the random noise. The baseline is constructed by drawing a straight line connecting the smoothed intensities at 12 and 14.5 degrees theta. An example of a typical diffraction pattern is shown in FIG. 10. The peak heights measured to the nearest millimetre are then coverted to counts. The control sample is analysed using an identical procedure.

Figure 10A:
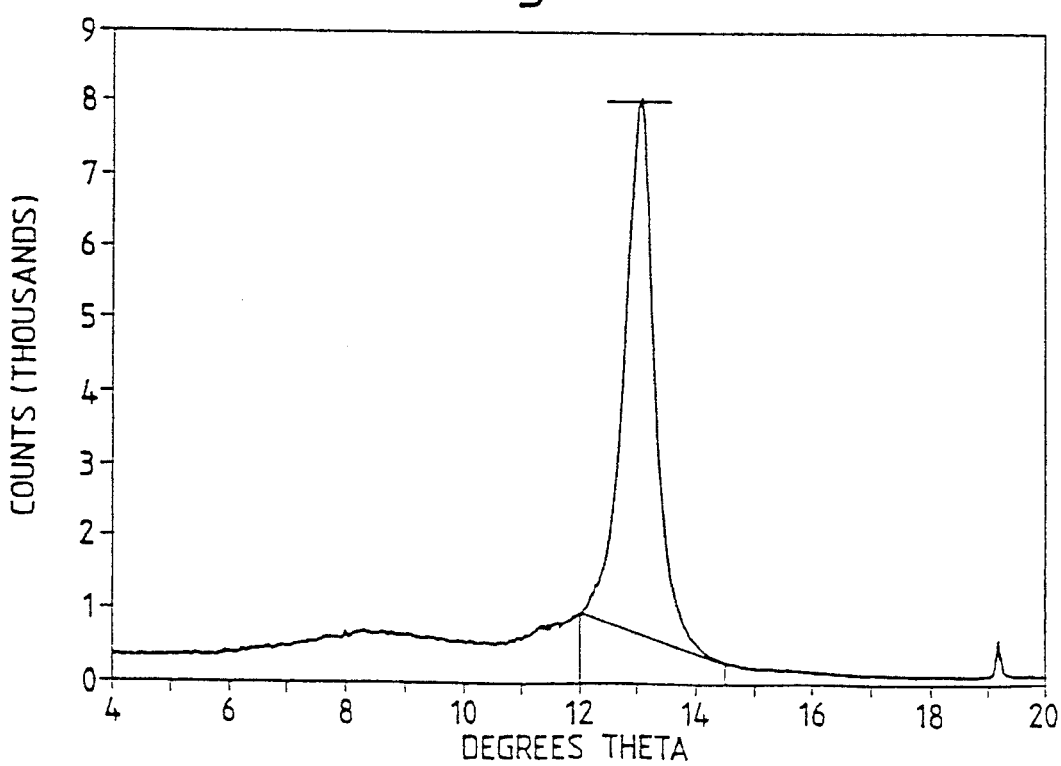

A diffraction pattern of ICI Melinex 800 film is shown in FIG. 10A. The baseline construction is shown. The broad peak centred at approximately 8.5 degrees theta is due to the scattering from the amorphous adhesive tape.

A ratio is calculated by dividing the counts of the test sample by the counts of the control sample. This is called the CRYSTALLINITY FACTOR (CF). It provides a composite measure of the orientation and crystallinity of the PET film in comparison to Melinex 800 film which is known to have a high degree of orientation and crystallinity.

$$(CF) = \frac{I(100)T}{I(100)C}$$

where I(100)T-Intensity of (100) peak for test sample
I(100)C=Intensity of (100) peak for control sample

Reproducibility of Control Samples

Three samples were taken from a reel of Melinex 800 12um film as specified above and the results were as follows,

| | |
|---|---|
| Sample A | 7332 cts |
| Sample B | 7332 cts |
| Sample C | 7264 cts |
| Mean = 7309 cts | Sample standard deviation (SD) = 39 cts |

Based on a normal distribution it would be expected that 99% of the control samples should be within +/−3 SD of the mean, that is between 7417 and 7201 cts. Any value outside of these limits is an indication that something has changed unexpectedly, for example either the film has aged or the output intensity of the X-ray tube has decreased.

Measurement of Aluminium Strip Temperature

1. Uncoated Aluminium

The measurement of moving, uncoated aluminium strip temperature presents significant difficulties. Contact measurements using thermocouples, for example, risk damaging the metal surface, are often inaccurate for rapidly moving strip and are not considered acceptable. Of the non-contact techniques, infra-red pyrometers are the most promising particularly for strip temperatures above 150°. The significant limitation of this infra-red radiation detection system lies in the very low and variable emissivity of uncoated aluminium surfaces. These properties give rise to inaccuracy and variability in recorded temperatures.

Of the systems available commercially, the Williamson 12300 pyrometer is considered one of the more successful devices for the temperature range of 200° C. to 300° C.

The temperature of the aluminium as it enters the lamination rolls is defined as T1.

2. Polymer Film Coated Aluminium

The coated aluminium surface temperature cannot be measured satisfactorily by contact techniques without unacceptable coating damage.

The presence of a polymer film on the metal surface after lamination increases the thermal emissivity substantially and effectively eliminates the variability in emissivity. For both polypropylene and polyester film coatings, commercial pyrometers exist that operate with a wavelength matching a strong absorption band in the polymer, permitting the accurate measurement of temperature for polymer coated aluminium Polypropylene—3.43 microns Polyester—7.9 microns.

3. Measurement (Estimation) of Temperature T1

The lamination equipment was configured initially as follows:

(1) Unwind system for uncoated coil.

(2) Triple induction-heated roll strip heater with fixed, constant roll temperatures adjusted to give accurately known metal temperatures for the strip leaving the roll heater system (TIS).

(3) Downward strip path at 45° to the vertical.

(4) Williamson 12300 pyrometer (measures T1 Williamson).

(5) Lamination rolls 0.5 m from the roll heater exit.

(6) Agema TPT300 (7.9 um) Pyrometer (measures T2E—the laminate temperature just prior to entering the transverse flux induction heater).

(7) A transverse flux induction heater 0.5 m from the nip rolls.

(8) Agema TPT 300 (7.9 um) pyrometer (measures T2).

(9) A quench 0.7 m from the induction heater.

(10) A turn roll in the quench.

(11) Strip drying, bridle and rewinder.

The strip temperature (TIS) was set using the roll heater and temperatures (T1 Williamson, T2E and T2) measured. (Table 1), for a line speed of 20M/minute, laminating 12 um polyester films to the AA 3004 aluminium (gauge 0.3 mm).

The loss of temperature between the roll heater and the lamination rolls is conveniently calculated using a mathematical model of the convective and radiative heat losses from the surface of the hot sheet to the surrounding environment at ambient temperature. The model takes into consideration plate orientation, natural convective losses, forced convection due to sheet motion and radiation from the plate which is assumed to have an emissivity of 0.1. The surrounding environment is assumed to have grey body characteristics with an emissivity of 0.9.

TABLE 1

| | Temperature (°C.) | | | | |
|---|---|---|---|---|---|
| T1S | T1 Williamson | T2E | T Loss | T1 | (T1 − T2E) |
| 220 | 213 | 170 | 9.0 | 211 | 41 |
| 240 | 228 | 189 | 9.4 | 230.6 | 41.6 |
| 260 | 248 | 207 | 10.5 | 249.5 | 42.5 |
| 280 | 270 | 222 | 11.7 | 268.3 | 46.3 |

The temperature of aluminium entering the lamination rolls (T1) was estimated and (T1–T2E) calculated. (Table 1).

The value of T1 is the critical temperature for thermal lamination of polymer film to metal. The relationship between T1 and the mean melting point of the polyester film contacting the hot metal governs the tacking of film to the metal, the critical intimacy of contact that eliminates voids at the polymer-metal interface, and the adhesion of polymer to metal.

T1 is difficult to measure, particularly if the aluminium strip is heated by techniques such as transverse flux induction heating or if the strip speed changes. T1 is estimated by taking an accurately known temperature, T2E and correcting the value for the calculated losses in the pre-lamination and lamination processes. The calculation in Table 1 illustrates the calculation of:

(1) T1 where TIS was accurately known.
(2) (T1–T2) for 12 micron PET film.

The lamination loss is used with the measured T2E to estimate T1 where no TIS value is known, as for example where a transverse flux induction heater or an air floatation oven (with high air over-temperature) is used to heat the aluminium.

In Table 3 (T2E +) has been used to calculate T1.

Film Resin Melting Point

Polymer materials, unlike metals, have no single temperature melting point but exhibit melting behaviour over a range of temperatures. The spread in molecular weight thermoplastic polymers like polyesters and polypropylenes and the variation in crystal sizes underlies the melting behaviour.

Differential Scanning Calorimetry (DSC) can be used to illustrate the melting behaviour and define an onset melting temperature $T_m$. It is the relationship between $T_m$ of the polyester contacting the metal and T1 that governs the effectiveness of lamination.

Method For Measuring the Onset Melting Point of PET Film by DSC

The measurement is conveniently made on the Perkin Elmer DSC7. Calibration is performed at two positions, with Indium using a melting point onset of 156.60° C. and with Tin using a melting point onset of 231.88° C.

Sample Preparation

The sample of PET is tested in the "as received" condition. If there is any indication that the sample has inadvertantly been heated above 50° C. it should be disgarded and another sample obtained. Discs of about 5 mm are punched from the film and a sample of 5 to 10 mg weighed to an accuracy of 0.01 mg. The sample is encapsulated in an aluminium pan with the lid crimped to seal the pan.

Testing Conditions

The sample is heated at a range of 20° C. per minute from 40° C. to 300° C. The sample chamber is purged with dry nitrogen during the heating run.

Calculation of Onset Temperature

Figure 11:
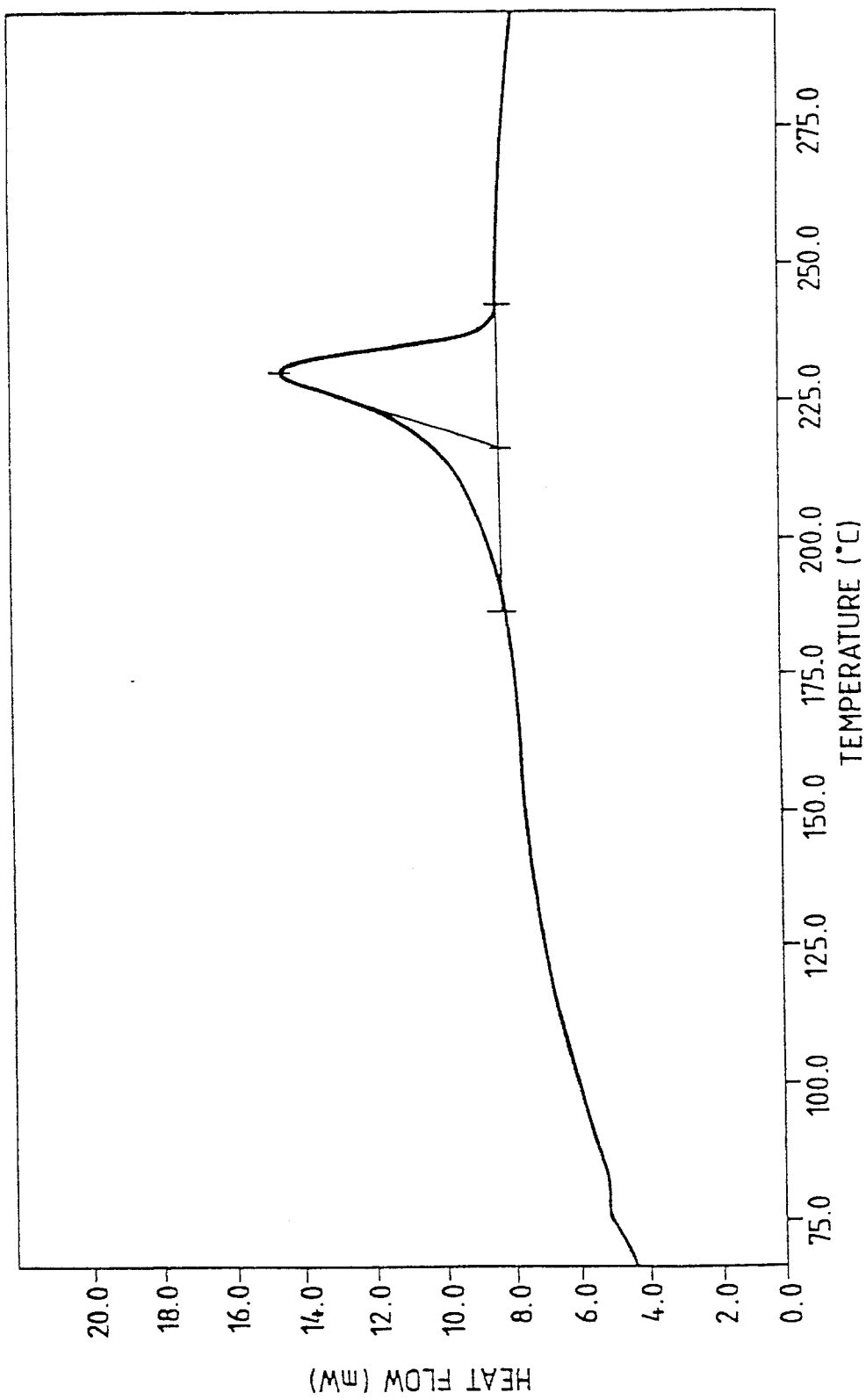
FIG. 11 shows a differential scanning calorimetry trace made between 40° C. and 300° C. giving the onset and peak melting temperatures of film B, as described in Table 6.

The melting peak around 230° C. is identified and the baseline is constructed by connecting the two stable lines on either side of the peak. Another construction line is made by extrapolating to the baseline a line from a tangent at the point or part of the curve prior to the Tm-peak where the line subtends the maximum angle with the baseline. Where this line meets the baseline is defined as the onsert temperature. This is illustrated in FIG. 11, which shows the onset and peak melting temperatures of film B, as described in Table 6. According to the FIG. an onset temperature of approximately 216.5° is measured, with a peak melting temperature of 230.4° C.

Precision

Repeatability: Duplicate determinations on two specimens by the same analyst should not differ by more than 1.5° C.

Reproducibility: Duplicate determinations on specimens of the same sample analysed in different laboratories should not differ by more than 2° C.

Copper Sulphate Test

In the following Examples the copper sulphating test to which the can ends are subjected requires a solution of acidified copper sulphate. This solution is prepared with the following composition:

1750 mls water
500 g hydrated copper sulphate
215 mls hydrochloric acid (35%).

Copper sulphate is placed in a can to a depth of 2.5 cm (1 inch) and the end to be tested is seamed on the can. The can is then stored upsidedown for 24 hours so that the end to be tested is covered in copper sulphate. The ends are then removed and examined.

Coating Integrity

In order to assess the integrity of the internal coating, ends were tested using a 1% sodium chloride solution as a conducting electrolyte. Ends were attached by a vacuum device to a cylindrical container holding the electrolyte and a voltage of 6.3 volts was applied across an electrode and the end. The current passing between the electrode and the end is a measure of the aluminium exposure through the coating on the end and is called the Enamel Rating Value (ERV).

Blushing and Adhesion

Ends are pasteurised at 70° C. for 45 minutes in water and inspected visually for change in appearance (blushing).

Adhesion is assessed by applying 3M 610 tape to an area of cross hatched scores cut into the polyester coating prior to pasteurisation, score spacing 1 mm in a 10×10 array of scores. Adhesion is assessed by the percentage of delaminated squares after vigorous removal of the tape.

Rapid Pack Test (RPT)

A solution is prepared containing citric acid, phosphoric acid and sodium chloride dissolved in deionized water. This solution is placed in the can and the can is covered with a plastic wrap and placed in an oven at 150° F. until the can fails by perforation. 20 cans are tested per variable and the mean time to failure is calculated and recorded.

Assessment of cracking of the polymer in the score and rivet region

The preferred method is to examine the internal polymer coating using a steromicroscope. A brightfield episcope ring illumination was used at magnifications ranging from ×10 to ×40 to give the preferred conditions. Cracking around the rivet and along the score potentially leading to metal exposure could be easily observed, if present.

Assessment of crazing after seaming

The end should be seamed onto a can under the standard seamer settings for beverage ends. The can should then be carefully cut away to expose the product side of the countersink wall region. This region should be examined using an optical microscope for the crazing of the polymer film.

DESCRIPTION OF THE EXAMPLES

The Examples are described in six tables:

TABLE 2 Table 2 demonstrates the relationships between metal composition, film type, end forming and end performance.

TABLE 3 Table 3 illustrates the relationships between film type and lamination conditions on coating properties and performance.

TABLE 4 Table 4 demonstrates the importance in selecting some shell forming tooling on shell performance.

TABLE 5 Table 5 defines the metal compositions.

TABLE 6 Table 6 defines the films used.

TABLE 7 Table 7 describes the metal surface treatment.

Unless otherwise stated all the Examples are examples of the invention.

TABLE 2

Table 2 demonstrates relationships in metal composition, film type and end performance.

Examples 1 to 4

Examples 1 to 4 demonstrate the effect of varying the RPD on a coextruded polyester film coated 0.30 mm 3004 material. As the RPD is increased from 5.2 cm (2.044") to 5.22 cm (2.056"), the countersink parameter falls from 0.97 to 0.93 mm, peaking pressure rises by 103 kPa (15 psi) and no metal deterioration occurred in the critical reformed region. Over the RPD range, chuck fit was maintained and shells remained interchangeable.

Figure 8:
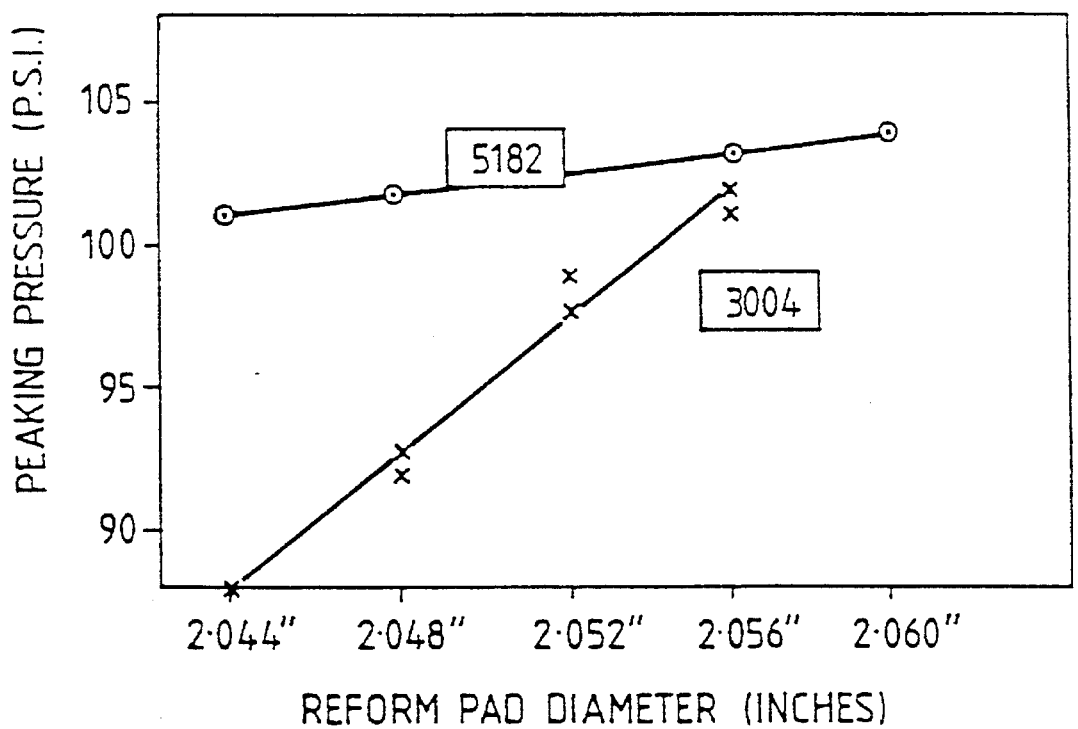
FIG. 8 shows a graph to illustrate the relationship between end peaking performance and reform pad diameter for 5182 and 3004 alloys.

Comparison of Examples 1 to 4 with 11 to 13 and 16 (FIG. 8) demonstrates that the behaviour of polymer film coated 3004 is unexpected and unusual, when compared to coated 5182.

Examples 8 to 10

Example 10 illustrates a comparison with Example 4 but with a 0.28 mm 3004 material. The peaking pressure is lower as expected from the relationship between metal gauge and shell strength.

Peaking Pressure = $kT.t^{1.1}$ k = constant dependent on end design

T = tensile strength t = metal gauge

Examples 5 to 7

In Examples 5 to 7, a similar pattern of behaviour is observed as for Examples 2 to 4 but with a coextruded polyester film coated aluminium (3XXX) lying outside the 3004 specification, having a 1.42% magnesium content. The peaking pressure rises by 69 kPa (10 psi) and the countersink parameter falls from 1.0 to 0.92 mm as the RPD is increased from 5.2 cm (2.048") to 5.22 cm (2.056").

Examples 11 to 14

Comparative Examples 11 to 14 are not examples of the invention. The material J lacquer coated 5182 has a magnesium content of 4.67% and manganese content of 0.34% both outside the range of the invention.

Internal lacquer—PVC organosol

External lacquer—epoxy based.

The peaking pressure rises by only 14 kPa (2 psi) as the RPD is increased from 5.2 cm (2.044") to 5.22 cm (2.056") and countersink parameter falls from 1.05 to 0.93 mm. Some disturbance of the reformed area occured at 5.22 cm (2.056") and 5.23 cm (2.060") RPD values.

Examples 11 to 14 represent the known behaviour of commercial end stock materials in end forming.

Examples 16 and 17

Comparative Examples 16 and 17 are not examples of the invention.

In Examples 16 and 17, polyester film coated 5182 was used instead of the lacquer coated 5182 of Examples 13 and 14. The performance and material disturbance characteristics of Examples 13 and 14 and 16 and 17 are similar, demonstrating that the type of coating or coating process are not important to the physical strength or cracking behaviour of 5182 end shells.

Examples 30 and 31

Comparative Example 30 is not an example of the invention having manganese and magnesium contents outside the range of the invention.

Comparison of Examples 11 and 30 illustrate that thinner gauge 5182 materials (Example 30) can give acceptable peaking performance but with a countersink depth of 6.86 mm (0.270 inches) that renders it not interchangeable with standard 6.35 mm (0.250 inch) countersink ends in commercial double seaming operations.

Similarly thin gauge products of the invention also give acceptable physical performance with a 6.86 mm (0.270 inch) countersink depth as illustrated by Example 31.

Examples 10, 18 and 19

The importance of countersink depth on peaking performance is further illustrated in Examples 18 and 19.

An increase in countersink depth from 6.35 mm (0.250") to 6.48 mm (0.255") increases the peaking pressure by 28 kPa (4 psi) without loss of interchangeability. The limit for interchangeability in double seaming is 6.48 mm (0.255").

Comparison of Examples 10 and 18 illustrates the variation experienced with similar tooling on different presses. Both utilise the same material but Example 18 was produced on a single-out press operated at low speed and Example 10 a double die press operating at 300 strokes per minute.

Examples 1, 20 to 24

Examples 1 and 20 to 23 demonstrate a range of biaxially oriented film types that can be combined with aluminium alloys of the invention, in these particular examples 3004.

Example 1 used coextruded polyester films on both metal surfaces and is illustrated in FIG. 2A in which both Ao and Ao' are the same PET and Ai and Ai' are both the same copolyester.

For Examples 20 and 23 monolayer copolyester films were used as illustrated in FIG. 3A in which A and A' are the same film. The films B and E were identical in composition but were heat set at different temperatures to give different crystallinities.

Example 21 is equivalent to Example 1 but used a coextruded film with different copolyester layer Ai, different PET layer Ao and different resin fillers.

In Example 22 a monolayer copolyester film was used but of a different composition to Examples 20 and 23.

Example 24 combines two different films as illustrated in FIG. 9. The coextruded polyester film is the film used in Example 1 and forms the external coating. The coextruded polypropylene film Bo/Bi is a co extrusion of:

Bi—Maleic anhydride graft modified polypropylene

Bo—Polypropylene.

These examples illustrate that different types of polyester film can be used successfully and combined with other film types for the internal film.

Examples 25 to 29 and 32

Examples 25 to 29 demonstrate that a range of manganese and magnesium contents may be used (with advantages in reduced metal production costs) and that there is no simple relationship between magnesium or manganese content and the physical performance (compare Examples 7 and 26). There is some evidence that end performance falls as magnesium and manganese contents rise.

Based on the general trend between end physical performance and magnesium and manganese contents of these low magnesium alloys, the upper limits for the contents of these elements can be judged. The upper limit for manganese is set at 1.5% and for magnesium at 2%. Thus, Examples 25 and 28 are considered to be comparative examples.

Examples 33 and 34

Examples 33 and 34 illustrate the use of coloured and white films as external coatings for can ends.

Example 34 also describes the use of a composite film.

TABLE 3

Table 3 illustrates the relationships between film type and lamination conditions on coating properties and performance. All the polymer film coated examples are based on metal compositions conforming to the invention.

Examples 4(i) to 4(iv)

Examples 4(i) and 4(iv) are not examples of the invention.

Examples 4(i) to 4(iv) and FIG. 6 demonstrate the effect of lamination temperature T2 on film crystallinity and coating "blushing" on pasteurisation of ends for coextruded PET film.

As T2 increases from 220° C. towards the PET melting point, film crystallinity falls as the lower molecular weight or smaller crystals melt. At a T2 of 250° C. the entire film is melted. Low crystallinity factor values, particularly below 0.05 allow visible recrystallisation to occur in pasteurisation giving an unsightly effect (Example 4(i)).

Table 3 also shows that amorphous (crystallinity factor= O) Example 4(i)) coatings perform badly in the copper sulphate accelerated corrosion test that simulates shelf life testing with aggressive real beverage products. Semi-crystalline coatings 4(ii) and 4(iii) perform well.

In Example 4(v) examination of the coated metal showed the presence of very small blisters at the polymer/metal interface and visible whitening of the coating on the end shell countersink region. The voiding effect occurs when the T1 value is below the melting point of the polymer contacting the metal surface and there is inadequate melting of the polymer into the metal surface. The melting point for the coextruded copolyester contacting the metal of film A lies in the range 180°–190° C. and in Examples 4(i) to 4(v), voiding only occurs in 4(v) where T1 is below the resin onset melting point.

Example 4(v) lies outside the preferred range in T1.

When the lamination temperature T2 lies close to the melting point inevitable temperature variation across the metal strip will give variability in coating crystallinity across the coated metal. It is advisable to maintain T2 at a value where there is little variation in crystallinity with temperature (see FIG. 6), typically below 235° C. for PET based film.

Examples 4, 7 and 10

Examples 4, 7 and 10 demonstrate that a range (210° C. to 250° C.) of T1 values can be used successfully with a common T2 (230° C.) for coextruded polyester film A. In each case the T1 value lies above the coextruded inner resin layer melting point which is in the range 180°–190° C.

Examples 4, 20 to 24 and 15

Examples 20 to 24 illustrate the use of different film types from those in Example 4. In each case T1 is chosen to lie above the film or inner layer onset melting point (to prevent interfacial voiding) and T2 selected to prevent significant loss of film crystallinity.

None of the polymer film coated examples suffered from blushing or adhesion failure.

Comparison of the RPT shelf life (an accelerated test) results for polymer coated examples (4, 20–24) and the lacquer coated 5182 Example 15 shows that polymer coatings enhance shelf life even where the countersink radius is tighter than for lacquered ends.

Example 15 is not an example of the invention but illustrates the deficiencies of lacquer coatings.

Example 25 demonstrates the use of a film with the onset melting point near the bottom end of the suggest range. Correspondingly lower T1 and T2 temperatures have been used to ensure the right combination of properties.

Examples 20(i) to (v) and 23(i) to (iv)

In Examples 20 and 23 the polymer films B and E are monofilm polyesters with the same chemical composition and melting point (212°–216° C.) but with different crystallinities arising from different heat-setting temperatures in the post-biaxial orientation phase of film making.

Comparative Examples 20(i), (iv) and (v), are not examples of the invention. Examples 20(i) and (iv) illustrate that T1 values below the onset melting point (Tm) give metal/polymer interface voids or blisters. Examples 20(i) and 20(iv) have T2 values close to Tm and the consequential loss of crystallinity that leads to "blushing" on pasteurisation. For Example 20(iv) the absence of second stage heating and relatively low T1 leads to poor adhesion of coating to metal. Only in Example 20(ii) and 20(iii) is there a satisfactory combination of properties.

Comparative Examples 23(i), (ii) and (iii) are not examples of the invention.

Examples 23(i) and (ii) illustrate the problems of poor adhesion if no second stage heating is used. In comparative Example 23(iii) a very high T1 has ensured good adhesion but caused loss of crystallinity that leads to "blushing" on pasteurisation (recrystallisation). This is not an example of the invention as the crystallinity factor is below 0.05. Therefore Examples 23(i), (ii) and (iii) lie outside the invention.

Example 23(iv) defines the preferred lower limit to polyester film crystallinity factor at about 0.05 by demonstrating the slight tendency to recrystallise with a crystallinity at about 0.05. Example 23(iv) therefore lies just inside the invention.

Examples 23(i), (ii) and (iii) follow the teaching of GB2123746 and demonstrate the deficiencies in this prior art.

Examples 35(i) to 35(vi)

Examples 35(i), 35(ii), 35(v) and 35(vi) are not examples of the invention.

Examples 35(i) to 35(iv) demonstrate the possible failure modes that can occur because the crystallinity factor is not maintained in the claimed range.

In examples 35(i) and 35(ii) the second stage heating temperature is too low and hence the crystallinity factor for the film is outside the upper limit of 0.5. In these examples severe cracking of the internal coating occurred around the rivet and score. The effect of this is in part demonstrated by the increased metal exposure found on enamel rating the ends.

In examples 35(v) and 35(vi) the second stage temperature is too high, and hence the crystallinity factor for the polymer coating is below the limit of 0.05. No cracking occurred on these ends, however after the ends were seamed onto cans, crazing could be seen around the countersink wall. This can lead to aluminium from the end dissolving into the product over the storage period.

Only in examples 35(iii) to 35(iv) do the right combination of properties ensure no cracking around the score of rivet or crazing on the countersink wall occurs.

Examples 36(i) to 36(vii)

Examples 36(i) 36(ii), 36(v), 36(vi) and 36(vii) are not examples of the invention.

In examples 36(i) and 36(ii) the second stage heating temperature is too low, outside the range specified in the formula (Tm(o)–3° C.>=T2>=Tm(o)–16° C.), which for this film (Tm(o) =241° C.) would give a range of 225°–238° C. In this case, the elevated metal temperature used reduces the crystallinity of the layer contacting the metal but does not affect the crystallinity of the outer region of the film. The crystallinity of the outer region then exceeds the required crystallinity factor, leading to severe cracking of this region of internal coating around the rivet and score. The effect of this is in part demonstrated by the increased metal exposure found on enamel rating the ends.

In examples 36(v), 36(vi) and 36(vii) the second stage temperature is too high, and hence the crystallinity factor for the polymer coating is below the limit of 0.05. No cracking occurred on these ends. However after the ends were seamed onto cans crazing could be seen around the countersink wall. This can lead to aluminium from the end dissolving into the product over the storage period.

Only in examples 36(iii) and 36(iv) do the right combination of properties ensure no cracking around the score of rivet or crazing on the countersink wall occurs. In these examples the entire polyester coating reaches a temperature of at least the onset temperature of the polyester less 16° C. This temperature results in an absence of any regions having a high degree of oriented crystalline material.

TABLE 4

Selection of tooling geometries is important in the end making and reforming processes and those skilled in the art will understand which parameters to control. Table 4 illustrates the importance of several factors.

Examples 1 to 2(a) show that the punch centre radius has a significant effect on material disturbance in the reformed region. A PCR of 1 mm (0.040") is preferred to 2 mm (0.080").

Examples 3 to 6(a) show that Draw Radius influences the countersink parameter and peaking performance.

TABLE 5

Table 5 defines the metal compositions in Tables 1 to 3.

TABLE 6

Table 6 describes the films used in Tables 1 and 2. All the films were biaxially oriented by the following process:

(1) Extrude resin onto chill roll.
(2) Draw in the forward direction on heated rollers.
(3) Draw in the transverse direction.
(4) Heat set in an oven.
(5) Cool.
(6) Rewind.

The polyester films had a draw ratio of about 3×3 to 4×4 and the biaxially oriented polypropylene a draw ratio of about 5×8 to 5×9.

TABLE 7

Table 7 describes the range of metal surface treatments used in the Examples of Table 1, 2 and 3.

TABLE 2

| Example Code | Metal Code | Metal Comp Mn | Metal Comp Mg | Metal Gauge (mm) | Proof Stress Laminated MPa | Film | RPD (cm) | Peaking Pressure (kPa) | Cracking or Roughening (sl = slight) | d (mm) | Punch Center Radius Inch × 1000 | Chuck fit | Inter Change-ability | Counter sink depth (mm) |
|---|---|---|---|---|---|---|---|---|---|---|---|---|---|---|
| 1 | A | 1.02 | 1.22 | 0.30 | 274 | A | 5.19 | 593 | None | 0.97 | 40 | Yes | Yes | 6.35 |
| 2 | A | 1.02 | 1.22 | 0.30 | 274 | A | 5.20 | 641 | None | 0.96 | 40 | Yes | Yes | 6.35 |
| 3 | A | 1.02 | 1.22 | 0.30 | 274 | A | 5.21 | 676 | None | 0.94 | 40 | Yes | Yes | 6.35 |
| 4 | A | 1.02 | 1.22 | 0.30 | 274 | A | 5.22 | 696 | None | 0.93 | 40 | Yes | Yes | 6.35 |
| 5 | C | 1.04 | 1.42 | 0.29 | 285 | A | 5.20 | 607 | None | 1.01 | 40 | Yes | Yes | 6.35 |

TABLE 2-continued

| Example Code | Metal Code | Metal Comp Mn | Metal Comp Mg | Metal Gauge (mm) | Proof Stress Laminated MPa | Film | RPD (cm) | Peaking Pressure (kPa) | Cracking or Roughening (sl = slight) | d (mm) | Punch Center Radius Inch × 1000 | Chuck fit | Inter Change-ability | Counter sink depth (mm) |
|---|---|---|---|---|---|---|---|---|---|---|---|---|---|---|
| 6 | C | 1.04 | 1.42 | 0.29 | 285 | A | 5.21 | 662 | None | 0.95 | 50 | Yes | Yes | 6.35 |
| 7 | C | 1.04 | 1.42 | 0.29 | 285 | A | 5.22 | 676 | None | 0.92 | 40 | Yes | Yes | 6.35 |
| 8 | H | 0.87 | 1.20 | 0.28 | 268 | A | 5.20 | — | None | — | 40 | Yes | Yes | 6.35 |
| 9 | H | 0.87 | 1.20 | 0.28 | 268 | A | 5.21 | — | None | — | 40 | Yes | Yes | 6.35 |
| 10 | H | 0.87 | 1.20 | 0.28 | 268 | A | 5.22 | 634 | None | 0.92 | 40 | Yes | Yes | 6.35 |
| 11 | J | 0.34 | 4.67 | 0.28 | 322 | L | 5.19 | 696 | None | 1.04 | 40 | Yes | Yes | 6.35 |
| 12 | J | 0.34 | 4.67 | 0.28 | 322 | L | 5.20 | 703 | No cracking but sl roughening | 0.96 | 40 | Yes | Yes | 6.35 |
| 13 | J | 0.34 | 4.67 | 0.28 | 322 | L | 5.22 | 710 | No cracking but sl roughening | 0.93 | 40 | Yes | Yes | 6.35 |
| 14 | J | 0.34 | 4.67 | 0.28 | 322 | L | 5.23 | 717 | No cracking but sl roughening | 0.89 | 40 | Marginal | No | 6.35 |
| 15 | J | 0.34 | 4.67 | 0.28 | — | L | 5.19 | 710 | None | 1.07 | 50 | Yes | Yes | 6.35 |
| 16 | J | 0.34 | 4.67 | 0.28 | 316 | A | 5.22 | 717 | Incipent crack | 0.93 | 40 | Yes | Yes | 6.35 |
| 17 | J | 0.34 | 4.67 | 0.28 | 316 | A | 5.23 | 717 | Roughened | 0.93 | 40 | Marginal | No | 6.35 |
| 18 | H | 0.87 | 1.20 | 0.28 | 268 | A | 5.22 | 600 | None | — | 40 | Yes | Yes | 6.35 |
| 19 | H | 0.87 | 1.20 | 0.28 | 268 | A | 5.22 | 627 | None | — | 40 | Yes | Yes | 6.35 |
| 20 | F | 0.88 | 1.18 | 0.29 | | B | 5.22 | 641 | None | 0.88 | 40 | Yes | Yes | 6.48 |
| 21 | A | 1.02 | 1.22 | 0.30 | 274 | C | 5.19 | — | — | — | 50 | Yes | Yes | 6.35 |
| 22 | A | 1.02 | 1.22 | 0.30 | 274 | D | 5.19 | — | — | — | 50 | Yes | Yes | 6.35 |
| 23 | F | 0.88 | 1.18 | 0.29 | | E | 5.22 | 662 | None | 0.88 | 40 | Yes | Yes | 6.48 |
| 24 | F | 0.88 | 1.18 | 0.29 | | A out F in | 5.22 | 655 | None | | 40 | Yes | Yes | 6.48 |
| 25 | I | 1.09 | 2.02 | 0.28 | 270 | K | 5.22 | 579 | None | 0.88 | 40 | Yes | Yes | 6.35 |
| 26 | D | 0.98 | 1.44 | 0.28 | 290 | B | 5.22 | 614 | Sl roughening | | 40 | Yes | Yes | |
| 27 | F | 0.88 | 1.18 | 0.28 | 270 | A | 5.22 | 634 | None | | 40 | Yes | Yes | 6.48 |
| 28 | I | 1.09 | 2.02 | 0.28 | 270 | A | 5.19 | 579 | None | 1.02 | 40 | Yes | Yes | 6.38 |
| 29 | E | 0.95 | 1.55 | 0.295 | 300 | A | 5.22 | 710 | Sl roughening | 0.88 | 40 | Yes | Yes | 6.48 |
| 30 | J | 0.34 | 4.67 | 0.245 | 322 | L | 5.19 | 634 | None | — | — | — | No | 6.86 |
| 31 | F | 0.88 | 1.18 | 0.26 | 270 | A | 5.19 | 710 | None | — | — | — | No | 6.86 |
| 32 | B | 1.06 | 1.04 | 0.295 | 296 | A | 5.21 | 710 | — | — | 40 | Yes | Yes | 6.35 |
| 33 | A | 1.02 | 1.22 | 0.30 | — | G Out A In | 5.19 | — | — | — | 40 | Yes | Yes | 6.35 |
| 34 | A | 1.02 | 1.22 | 0.30 | — | J Out H In | 5.19 | — | — | — | 40 | Yes | Yes | 6.35 |
| 35 | K | 1.05 | 1.25 | 0.27 | — | A | 5.21 | 669 | None | 0.92 | 40 | Yes | Yes | 6.43 |
| 36 | K | 1.05 | 1.25 | 0.27 | — | C | 5.22 | 627 | None | 0.92 | 40 | Yes | Yes | 6.43 |

TABLE 3

| Example Code | Metal Code | Film Code | T1 (°C.) | T2 (°C.) | Crystallinity factor | "Blush" | ERV's (mA) | Corrosion by CuSO4 | Adhesion Failure | RPT Days | Blisters in Coating | Cracking around score and mmt | Crazing on countersink wall after seaming |
|---|---|---|---|---|---|---|---|---|---|---|---|---|---|
| (part 1) | | | | | | | | | | | | | |
| 4 | A | A | 211 | 230 | 0.465 | None | 0.6 | None | None | — | No | | |
| 7 | C | A | 195 | 230 | | None | 0.005 | None | None | 29 | No | | |
| 10 | H | A | 224 | 230 | 0.315 | None | 0.05 | None | None | 34 | No | | |
| 20 | F | B | 222 | 210 | 0.15 | None | 0.2 | None | None | 20 | | | |
| 21 | A | C | 230 | 230 | — | None | — | None | None | — | | | |
| 22 | A | D | 230 | 210 | — | None | — | None | None | 28 | | | |
| 23 | F | E | 250 | 220 | — | None | 0.0 | None | None | 22 | | | |
| 24 | F | A outside F inside | 210 | 230 | 0.48 (A) | None | 0.0 | None | None | 25 | | | |
| 15 | J | L | — | — | — | None | 0.39 | None | None | 19* | | | |
| 25 (i) | I | K | 206 | 190 | 0.160 | None | 0. | None | None | — | No | | |
| cf 4 (i) | G | A | 210 | 250 | 0. | Severe | | Severe | None | — | No | | |

TABLE 3-continued

| Example Code | Metal Code | Film Code | T1 (°C.) | T2 (°C.) | Crystallinity factor | "Blush" | ERV's (mA) | Corrosion by CuSO4 | Adhesion Failure | RPT Days | Blisters in Coating | Cracking around score and mmt | Crazing on countersink wall after seaming |
|---|---|---|---|---|---|---|---|---|---|---|---|---|---|
| 4 (ii) | G | A | 213 | 240 | 0.06 | None | | None | " | — | No | | |
| 4 (iii) | G | A | 213 | 230 | 0.465 | None | | None | " | — | No | | |
| 4 (iv) | G | A | 220 | 220 | 0.575 | None | | None | " | — | No | | |
| 4 (v) | G | A | 160 | 230 | 0.479 | None | | None | " | — | Yes | | |
| cf 20 (i) | A | B | 211 | 230 | 0. | Severe | | Severe | None | — | Yes | | |
| 20 (ii) | A | B | 222 | 210 | 0.15 | None | | None | None | — | No | | |
| 20 (iii) | A | B | 222 | 200 | 0.17 | None | | None | None | — | No | | |
| 20 (iv) | A | B | 213 | — | 0.40 | None | | None | Fail | — | Yes | | |
| 20 (v) | A | B | 230 | 230 | 0. | Severe | | Severe | None | — | No | | |
| cf 23 (i) | A | E | 230 | — | 0.33 | None | | None | Fail | — | Yes | | |
| 23 (ii) | A | E | 250 | — | 0.25 | None | | — | Marginal | — | No | | |
| 23 (iii) | A | E | 269 | — | 0.03 | Moderate | | — | None | — | No | | |
| 23 (iv) | A | E | 250 | 210 | 0.05 | Very slight | | — | None | — | Yes | | |
| | | | | | | (part 2) | | | | | | | |
| 31 | F | A | 250 | 230 | | None | 0.05 | — | None | — | No | | |
| 35 (i) | K | A | 228 | 215 | 0.576 | None | 1.14 | | None | — | No | Severe | None |
| 35 (ii) | K | A | 228 | 220 | 0.555 | None | 1.53 | | None | — | No | Severe | None |
| 35 (iii) | K | A | 228 | 225 | 0.433 | None | 1.80 | | None | — | No | v. slight | None |
| 35 (iv) | K | A | 228 | 230 | 0.093 | None | 0.34 | | None | — | No | None | None |
| 35 (v) | K | A | 228 | 235 | 0.010 | | 0.23 | | None | — | No | None | Severe |
| 35 (vi) | K | A | 228 | 240 | 0.000 | | 0.40 | | None | — | No | None | Severe |
| 36 (i) | K | C | 248 | 215 | 0.422 | None | 6.89 | | None | — | No | Severe | None |
| 36 (ii) | K | C | 248 | 220 | 0.308 | None | 22.2 | | None | — | No | Severe | None |
| 36 (iii) | K | C | 248 | 225 | 0.292 | None | 2.45 | | None | — | No | Slight | None |
| 36 (iv) | K | C | 248 | 230 | 0.236 | None | 1.0 | | None | — | No | None | None |
| 36 (v) | K | C | 248 | 235 | 0.037 | | 1.4 | | None | — | No | None | Moderate |
| 36 (vi) | K | C | 248 | 240 | 0.004 | | 0.6 | | None | — | No | None | Severe |
| 36 (vii) | K | C | 248 | 245 | 0.000 | | 0.8 | | None | — | No | None | Severe |

Note
*The RPT failure mode was by corrosion on the countersink radii.

TABLE 4

The Effect of Tooling Configurations on Performance

| Example Code | Metal Code | Film Code | RPD (cm) | Shell Performance (kPa) | Cracking | PCR μm | Draw Radius μm | Countersink parameter 'd' (mm) |
|---|---|---|---|---|---|---|---|---|
| 1 | A | A | 5.19 | 593 | No | 1 | 1 | 0.97 |
| 1 (a) | A | A | 5.19 | — | Yes | 2 | 1 | 1.05 |
| 2 | A | A | 5.20 | 641 | No | 1 | 1 | 0.91 |
| 2 (a) | A | A | 5.20 | 634 | Yes | 2 | 1 | 0.96 |
| 3 | A | A | 5.21 | 676 | No | 1 | 1 | 0.94 |
| 3 (a) | A | A | 5.21 | 683 | No | 1 | 1.78 | 0.91 |
| 4 | A | A | 5.22 | 696 | No | 1 | 1 | 0.93 |
| 4 (a) | A | A | 5.22 | 703 | No | 1 | 1.78 | 0.87 |
| 6 | O | A | 5.21 | 655 | No | 1 | 1 | 0.99 |
| 6 (a) | C | A | 5.21 | 662 | No | 1 | 1.78 | 0.91 |

TABLE 5

Metal Composition

| Metal Code | Cu | Si | Fe | Mn | Mg | Zn | Cr | Ti | Notes (1) |
|---|---|---|---|---|---|---|---|---|---|
| A | 0.21 | 0.10 | 0.38 | 1.02 | 1.22 | 0.03 | 0.01 | 0.03 | 3004 |
| B | 0.135 | 0.18 | 0.47 | 1.06 | 1.04 | 0.019 | 0.02 | 0.02 | 3004 |
| C | 0.22 | 0.14 | 0.27 | 1.04 | 1.42 | 0.04 | 0.01 | — | 3XXX |
| D | 0.19 | 0.15 | 0.34 | 0.98 | 1.44 | 0.01 | 0.03 | 0.008 | 3XXX Not Homogenised |
| E | 0.14 | 0.17 | 0.5 | 0.95 | 1.55 | 0.015 | 0.01 | 0.025 | 3XXX |
| F | 0.14 | 0.23 | 0.38 | 0.88 | 1.18 | 0.01 | — | 0.01 | 3004 |
| G | 0.22 | 0.20 | 0.40 | 0.87 | 1.40 | — | — | — | 3XXX |
| H | 0.22 | 0.20 | 0.40 | 0.87 | 1.20 | — | — | — | 3004 |
| I | 0.21 | 0.23 | 0.34 | 1.09 | 2.02 | 0.03 | 0.01 | — | Cast and rolled 5017 |

TABLE 5-continued

| Metal Code | Cu | Si | Fe | Mn | Mg | Zn | Cr | Ti | Notes (1) |
|---|---|---|---|---|---|---|---|---|---|
| J | 0.15 | 0.20 | 0.35 | 0.34 | 4.67 | 0.25 | 0.1 | 0.1 | 5182 |
| K | 0.30 | 0.17 | 0.8 | 1.05 | 1.25 | 0.25 | — | 0.1 | 3XXX |

Note
(1) 3XXX is a material closely related to 3004 but with a magnesium content above 1.3% and below the 1.9% for 5017.

TABLE 6

| | | Film Types | | | | | |
|---|---|---|---|---|---|---|---|
| Film Code | Construction | Bonding layer mp (°C.) ONSET | Bonding layer mp (°C.) PEAK | Bulk layer mp (°C.) ONSET | Bulk layer mp (°C.) PEAK | Composition bonding layer | Composition bulk layer | Gauge (microns) | Heat set (°C.) (1) |
|---|---|---|---|---|---|---|---|---|---|
| A | Coextruded | 185 | 205 ± 5 | 237 | 248 | 2 acids 1 glycol | "PET" | 12 | 220 |
| B | Monolayer | | — | 217 | 235 | — | 2 acid 2 glycols | 12 | 165 |
| C | Coextruded | 220 | 235 | 241 | 255 | Blend of two copolyesters | "PET" | 12 | 220 |
| D | Monolayer | | — | 213 | 230 | — | 1 acid 2 glycols | 12 | 180 |
| E | Monolayer | | — | 215 | 232 | — | 2 acids 2 glycols | 12 | 190 |
| L | Monolayer | | | 215 | 232 | — | 2 acids 2 glycols | 12 | 185 |
| F | Coextruded | 135 | 150 | 150 | 168 | Maleic anhydricle graft modified polypropylene | Polypropylene | 20 | 155 |
| L | Lacquered | | — | | | | Internal-organosol External-epoxy | 8 | — |
| G | Coextruded | 185 | 205 ± 5 | 235 | 250 | 2 acids 1 glycol | Titanium dioxide in "PET" | 25 | 210 |
| H | Composite | | 105 (2) | — | 250 | Amorphous polyester | PET | 12 | 220 |
| J | Coextruded | 185 | 205 ± 5 | 235 | 250 | 2 acids 1 glycol | PET containing Red Dye | 15 | 220 |
| K | Monolayer | | — | 200 | 215 | — | 1 acid 2 glycols | 12 | 190 |

Notes
1) Approximate values from DSC
2) Softening point (amorphous polyester)

TABLE 7

| | Metal Surface Composition | |
|---|---|---|
| Example | Metal Code | Surface Treatment |
| 1 to 4 | A | SAA |
| 5 to 7 | C | SAA |
| 8 to 10 | H | SAA |
| 11 to 15, 30 | J | Chromium phosphate |
| 16 | J | PAA |
| 17 | J | Zirconium phosphate |
| 18 to 19 | H | SAA |
| 2, 23, 24 | F | Chromium phosphate |
| 21 to 22 | A | PAA |
| 25, 28 | I | None |
| 26 | D | SAA |
| 27 | F | SAA |
| 31 | F | Chromium phosphate |
| 32 | B | Chromium phosphate |
| 33 | A | SAA |
| 34 | A | SAA |
| 35 | K | CHromium phosphate |

Note
1. SAA is sulphuric acid anodised.
2. PAA is phosphoric acid anodised.

We claim:

1. A can end formed from a metal sheet having adhered thereto a coating of a semi-crystalline thermoplastic polyester film wherein the can end comprises central panel, a panel wall dependent from the periphery of the central panel, an annular countersink bead extending outwardly from the panel wall, a chuck wall extending upwardly from the periphery of the countersink bead and an annular seaming panel extending radially from the chuck wall, wherein the metal sheet comprises an aluminium alloy having a magnesium content between 0.8% and 2.0% by weight and a manganese content between 0.6% and 1.5% by weight; wherein the polyester coating has a crystallinity factor in the range 0.05 to 0.5 as measured by X-ray diffraction and has no substantial regions of oriented crystalline polyester having a crystallinity factor above 0.5; and wherein the distance between the chuck wall and panel wall is between 0.85 mm and 1.0 mm as measured at a height of 0.45 mm above the lowest part of the upper surface of the countersink bead.

2. A can end according to claim 1, wherein the polyester film is heated EQ a temperature T$>=$Tm$-16°$ C. during the lamination of the film to to the metal sheet wherein Tm is the onset melting temperatures of the polyester film.

3. A can end according to claim 1, wherein the aluminium alloy is aluminium 3004.

4. A can end according to claim 1, wherein the semi-crystalline thermoplastic polyester film comprises a monolayer film.

5. A can end according to claim 4, wherein the monolayer film has been adhered to a major surface of the metal sheet by thermal lamination comprising heating the metal sheet to a temperature T1, applying the film to form an initial laminate and reheating the initial laminate to a temperature T2 to form a final laminate of metal sheet and semi-crystalline thermoplastic polyester, wherein, for an onset melting temperature Tm of the monolayer film, Tm–5° C.<=T1<=Tm+40° C. and Tm–5° C.>=T2>=Tm–20° C.

6. A can end according to claim 1, wherein the semi-crystalline thermoplastic polyester comprises a copolyester of terephthalic acid, azelaic acid, ethylene glycol and diethylene glycol.

7. A can end according to claim 1, wherein the semi-crystalline thermoplastic polyester comprises a copolyester of terephthalic acid, ethylene glycol and diethylene glycol.

8. A can end according to claim 1, wherein the semi-crystalline thermoplastic polyester film comprises a coextruded film comprising an inner layer and an outer layer wherein the inner layer is adjacent to the metal sheet.

9. A can end according to claim 8, wherein the inner layer of the coextruded film comprises a copolyester of isophthalic acid, terephthalic acid and ethylene glycol.

10. A can end according to claim 8, wherein the inner layer of the coextruded film comprises a copolyester of terephthalic acid, ethylene glycol and diethylene glycol.

11. A can end according to claim 8, wherein the outer layer of the coextruded film comprises polyethylene terephthalate.

12. A can end according to claim 8, wherein the coextruded film has been adhered to a major surface of the metal sheet by thermal lamination comprising heating the metal sheet to a temperature T1, applying the film to form an initial laminate and reheating the initial laminate to a temperature T2 to form a final laminate of metal sheet and semi-crystalline thermoplastic polyester, wherein, for onset melting temperatures Tin(i) and Tin(o) of the inner and outer layers respectively, Tin(i)<=T1<=Tm(o)+15° C. and Tin(o)–3° C.>=T2>=Tm(o)–16° C.

13. A can end according to claim 1, wherein the semi-crystalline thermoplastic polyester film comprises a composite film comprising an inner layer and an outer layer wherein the inner layer is adjacent to the metal sheet.

14. A can end according to claim 13, wherein the outer layer is biaxially oriented polyethylene terephthalate.

15. A can end according to claim 13, wherein the inner layer comprises an amorphous polyester.

16. A can end according to claim 1, wherein the other major surface of the metal sheet is coated with a coextruded polyolefin film comprising an inner layer of maleic anhydride graft modified polyolefin and an outer layer of polyolefin wherein the inner layer is adjacent to the metal sheet.

17. A can end according to claim 16, wherein the polyolefin is polypropylene.

18. A can end according to claim 16, wherein the polyolefin is an ethylene-propylene copolymer.

19. A can end according to claim 16, wherein the coextruded polyolefin film is biaxially oriented.

20. A can end according to claim 1, wherein the polyester film is pigmented with titanium dioxide.

21. A can end according to claim 1, wherein the polyester film is colored with a colored dyestuff.

22. A can end according to claim 1, wherein the surface of the metal sheet is pretreated after cold rolling with chromium phosphate, zirconium phosphate or anodising processes.

23. A process for producing a can end comprising forming a laminate of metal sheet and polyester, the metal sheet comprising an aluminium alloy having a magnesium content of 0.8 to 2.0% by weight, and manganese content 0.6 to 1.5%, by weight wherein the process comprises thermally laminating a monolayer polyester film to a major surface of the metal sheet heated to a temperature T1 to form an initial laminate and reheating the initial laminate to a temperature T2, wherein, for an onset melting temperature Tm of the monolayer polyester film, Tm–5° C.<=T1<=Tm+40° C. and Tm–5° C.>=T2>=Tm–20° C., and the crystallinity factor of the polyester film in the laminate is in the range 0.05 to 0.5 as measured by X-ray diffraction; and wherein the process further comprises forming the laminate into a can end wherein the can end comprises a central panel, a panel wall dependent from the periphery of the central panel an annular countersink bead extending outwardly from the panel wall, a chuck wall extending upwardly from the periphery of the countersink bead and an annular seaming panel extending radially from the chuck wall such that the distance between the chuck wall and panel wall is between 0.85 mm and 1.0 mm as measured at a height of 0.45 mm above the lowest part of the upper surface of the countersink bead.

24. A process according to claim 23, wherein the crystallinity factor of the monolayer polyester film applied to the metal sheet is in the range 0.08 to 0.45 as measured by X-ray diffraction.

25. A process according to claim 23, wherein the polyester comprises a copolyester of terephthalic acid, azelaic acid, ethylene glycol and diethylene glycol.

26. A process according to claim 23, wherein the polyester comprises a copolyester of terephthalic acid, ethylene glycol and diethylene glycol.

27. A process according to claim 23, wherein the aluminium alloy is aluminium 3004.

28. A process according to claim 23, wherein the other major surface of the metal sheet is coated with a coextruded polypropylene film having an inner layer of maleic anhydride graft modified polypropylene-and an outer layer of polypropylene or propylene-ethylene copolymer wherein the inner layer is adjacent to the metal sheet.

29. A process according to claim 28, wherein both major surfaces of the metal sheet are coated simultaneously.

30. A process for producing a can end comprising forming a laminate of metal sheet and polyester, the metal sheet comprising an aluminium alloy having a magnesium content of 0.8 to 2%, by weight and manganese content 0.6 to 1.5%, by weight wherein the process comprises thermally laminating a coextruded polyester film to a major surface of the metal sheet heated to a temperature T1 to form an initial laminate and reheating the initial laminate to a temperature T2, the coextruded polyester film comprising an inner layer and an outer layer with the inner layer adjacent to the metal sheet, wherein for melting temperatures Tm(i) and Tm(o) of the inner and outer layers respectively, Tm(i)<=T1<= Tm(o)+15° C. and Tm(o)–3° C.>=T2>=Tm(o)–16° C., and the crystallinity factor of the polyester in the outer layer of the laminate is in the range of 0.05 to 0.5 as measured by X-ray diffraction and wherein the process further comprises forming the laminate into an end wherein the can end comprising central panel, a panel wall dependent from the periphery of the central panel, an annular countersink bead extending outwardly from the panel wall, a chuck wall extending upwardly from the periphery of the countersink bead and an annular seaming panel extending radially from the chuck wall such that the distance between the chuck wall and panel wall is between 0.85 mm and 1.0 mm measured at a height of 0.45 mm above the lowest part of the upper surface of the countersink bead.

31. A process according to claim 30, wherein the inner layer comprises a copolyester of isophthalic acid, terephthalic acid and ethylene glycol.

32. A process according to claim 30, wherein the layer comprises a copolyester of terephthalic acid, ethylene glycol and diethylene glycol.

33. A process according to claim 27, wherein the outer layer comprises polyethylene terephthalate.

34. A process for producing a can end comprising forming a laminate of metal sheet and polyester, the metal sheet comprising an aluminium alloy having a magnesium content of 0.8 to 2%, by weight and manganese content 0.6 to 1.5%, by weight wherein the process comprises thermally laminating a composite polyester film to a major surface of the metal sheet heated to a temperature T1 to form an initial laminate and reheating the initial laminate to a temperature T2, the composite polyester film comprising an inner layer and an outer layer With the inner layer adjacent to the metal sheet, wherein, for melting temperatures $Tm(i)$ and $Tm(o)$ of the inner and outer layers respectively, $Tm(i) <= T1 <= Tm(o)+15°$ C. and $Tm(o)-3°$ C. $>= T2 >= Tm(o)-16°$ C., and the crystallinity of the polyester in the outer layer of the laminate is in the range 0.05 to 0.5 as measured by X-ray diffraction; and wherein the process further comprises forming the laminate into a can end wherein the can end comprises a central panel, a panel wall dependent from the periphery of the central panel, an annular countersink bead extending outwardly from the panel wall, a chuck wall extending from the periphery of the countersink bead and annular seaming panel extending radially from the chuck wall such that the distance between the chuck wall and panel wall is between 0.85 mm and 1.0 mm as measured at a height of 0.45 mm above the lowest part of the upper surface of the countersink bead.

35. A process according to claim 34, wherein the outer layer is biaxially oriented polyethylene terephthalate.

36. A process according to claim 34, wherein the inner layer comprises an amorphous polyester.

* * * * *